US011580180B2

(12) United States Patent
Kent et al.

(10) Patent No.: US 11,580,180 B2
(45) Date of Patent: Feb. 14, 2023

(54) JOB PROSPECT AND APPLICANT INFORMATION PROCESSING

(71) Applicant: Jobwell, Inc., San Mateo, CA (US)

(72) Inventors: Daniel Kent, San Mateo, CA (US);
May Lu, San Mateo, CA (US);
Richard Lin, Berkeley, CA (US)

(73) Assignee: Jobwell, Inc., San Mateo, CA (US)

( * ) Notice: Subject to any disclaimer, the term of this patent is extended or adjusted under 35 U.S.C. 154(b) by 243 days.

(21) Appl. No.: 16/411,806

(22) Filed: May 14, 2019

(65) Prior Publication Data

US 2020/0364282 A1    Nov. 19, 2020

(51) Int. Cl.
*G06F 16/9535* (2019.01)

(52) U.S. Cl.
CPC ................. *G06F 16/9535* (2019.01)

(58) Field of Classification Search
CPC .................................................. G06F 16/9535
See application file for complete search history.

(56) References Cited

U.S. PATENT DOCUMENTS

| 6,728,695 | B1* | 4/2004 | Pathria | G06F 16/313 |
| 10,860,803 | B2* | 12/2020 | Fung | G06N 3/0454 |
| 2010/0324970 | A1* | 12/2010 | Phelon | G06Q 10/1053 |
| | | | | 705/321 |
| 2011/0055098 | A1* | 3/2011 | Stewart | G06Q 10/1053 |
| | | | | 705/321 |
| 2012/0095933 | A1* | 4/2012 | Goldberg | G06F 16/353 |
| | | | | 705/321 |
| 2019/0042601 | A1* | 2/2019 | Ashe | G06F 16/9535 |
| 2019/0052720 | A1* | 2/2019 | Guo | G06F 3/0483 |
| 2019/0095869 | A1* | 3/2019 | Zhang | G06F 16/00 |
| 2019/0188648 | A1* | 6/2019 | Ruiz | G06F 16/9536 |
| 2019/0236125 | A1* | 8/2019 | Loeppky | G06F 40/186 |
| 2020/0004886 | A1* | 1/2020 | Ramanath | G06F 16/248 |

OTHER PUBLICATIONS

Cervino, B., "Trello For HR: The Best Boards for People Teams," Apr. 2018, downloaded from https://blog.trello.com/trello-boards-for-hr-teams on Sep 5, 2019, 11 pgs.

* cited by examiner

*Primary Examiner* — James Trujillo
*Assistant Examiner* — Michal Bogacki
(74) *Attorney, Agent, or Firm* — Frost Brown Todd LLP

(57) ABSTRACT

A system and improved method for managing an individual's job applications and networking processes in a digital, visual manner. In one aspect of the present invention, the platform is realized in the form of a web application with different sections, including one for tracking job applications, one for tracking networking outreach and engagement, and another for seeing tasks from both of those other sections. Data relevant to individual job applications and networking opportunities is stored in each section and displayed in an interactive kanban board-manner to enable them to manipulate their status and stay organized. Additional integrations and features include permitting importing and exporting data to third party servicers, such as job boards, applicant tracking systems, and calendars, and automated movement and prioritization using artificial intelligence/machine learning techniques applied to specific and aggregated data from other users. Machine learning further augments the application by providing additional guidance and data.

19 Claims, 30 Drawing Sheets

JOB PROSPECT AND APPLICANT INFORMATION PROCESSING

FIELD

The present invention relates to digital computer and Internet programs and applications. More specifically, the present invention relates to digital productivity, organization, and management tools to help individuals in their job search and networking processes.

BACKGROUND

In today's competitive landscape, the process for finding a job is laborious, filled with uncertainty, and overwhelming. Candidates frequently must apply to dozens and sometimes hundreds of job postings across many different websites and channels to receive a single invitation to interview. Before receiving an offer, they experience multiple rounds of interviews on the phone, through video-conferencing platforms, or in person, typically without receiving any sort of feedback. As the Internet has increased in scale and commercial importance, the growing visibility of job postings now often results in hundreds of individuals applying and interviewing for positions that will accept only one candidate. This yields significant inefficiency on the part of companies and perhaps more so for jobseekers as they have to juggle more open applications. Further, an increasingly important component of the modern job search is the process of networking, informational interviews, and getting internal referrals and informal recommendations. Organizing this outreach and the status of these processes can also be difficult to manage. Indeed, even keeping in touch with professional and personal connections can be an unstructured, laborious, even overwhelming process that demands more than the human mind can manage.

Presently, there are very few tools to aid individuals in tracking and organizing a job search; there are even fewer to help with conducting job search-related networking. Among the most common tools used include tracking one's job search and networking in a digital spreadsheet program on a computer, using a physical notebook, or using a whiteboard, which usually all lack the cross-system integration with other resources such as online job (availability) boards, applicant tracking systems, digital calendars, and other job-seeking and networking resources. The result is that the jobseeker must juggle multiple websites, tools, and resources and, to keep up-to-date, update all of them so no balls are dropped. This typically leads to additional stress, frustration, actions taken on stale information, and the feeling that the jobseeker is not in control of their own job-seeking process.

SUMMARY

The present disclosure marries technology in the form of a novel digital organizational platform and a productivity methodology called kanban with systems and methods that have not been applied to this need before.

Kanban methodology has long been known to have benefits for managing and improving system processes by providing visual process management of tasks and objectives. Originally inspired during the development of lean manufacturing practices, kanban methodology has been applied to new areas of work such as software development and business development. Kanban boards illustrate progress when work items, represented by cards or notes, are moved from left to right among columns that represent stages in a linear progression. By leveraging structures and concepts from kanban methodology, the present invention improves upon existing methods and products involving one's job search and networking activities.

BRIEF DESCRIPTION OF THE DRAWINGS

FIG. 5 is an exemplary user interface dialog for manipulating job card data in the illustrated embodiments.

FIG. 17 is a simulated screenshot of a first visualization interface for goals and recommendations in the illustrated embodiments.

FIG. 24 is a simulated screenshot of the user interface showing job application and networking opportunity tasks and due dates in the illustrated embodiments.

DESCRIPTION

Overview

Figure 1:
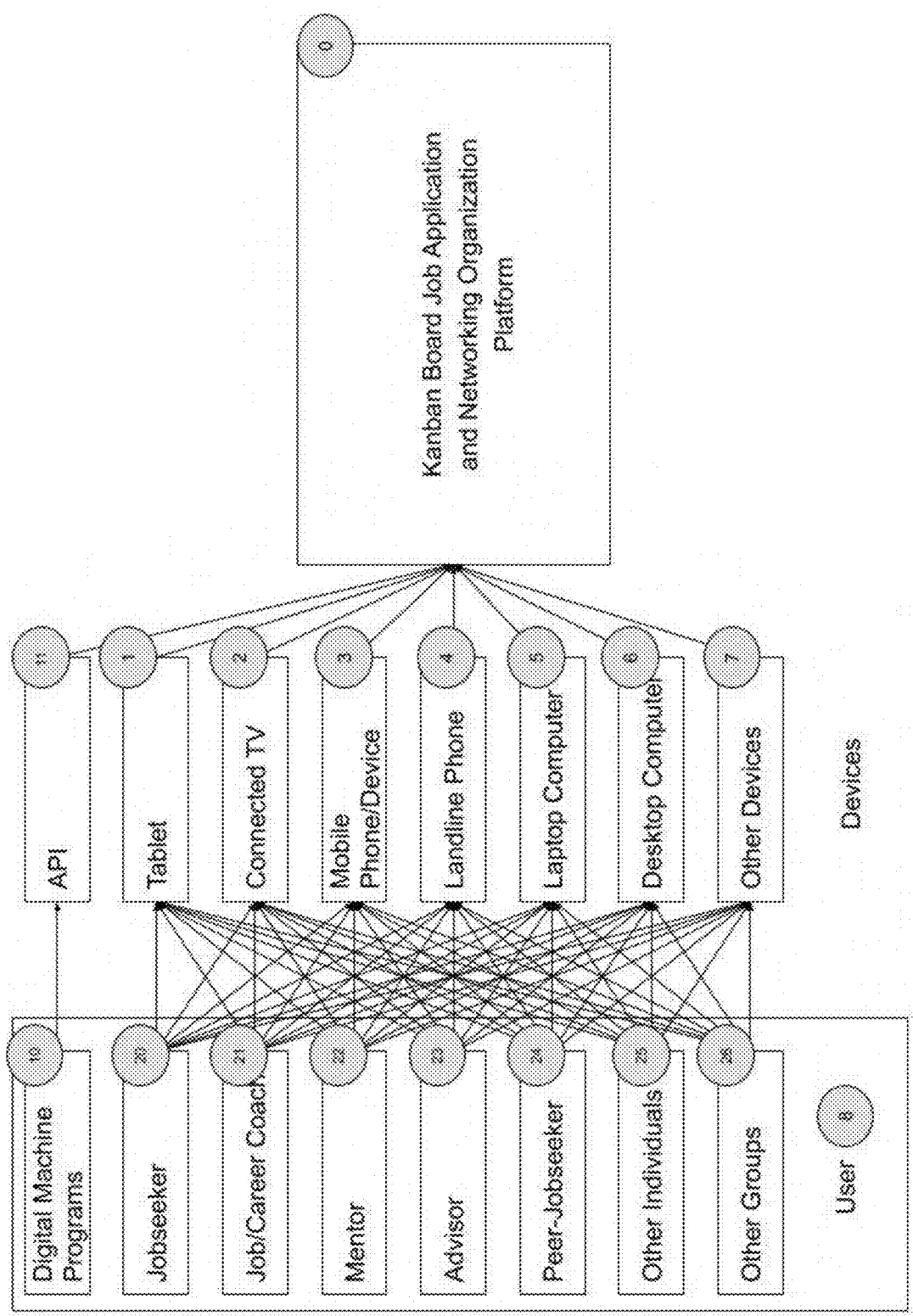
FIG. 1 is a block diagram of an exemplary embodiment of a system according to the present disclosure.

For the purpose of promoting an understanding of the principles of the present invention, reference will now be made to the embodiments illustrated in the drawings, and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates. The disclosed systems and methods allow computers, for the first time, to provide rapid access to and processing of employment and networking information for a large number of job opportunities and networking contacts, as well as easy and even automated prioritization of activities associated with each.

Job Board Users & Structure

In the disclosed embodiments, organization, tracking, and implementation of goal setting and planning occur in a productivity and management tool utilizing kanban techniques and methodologies on a digital kanban board. As depicted in FIG. 1, in one embodiment, users are presented with an application 0 accessible via an electronic interactive device such as a tablet 1, a connected TV 2, a mobile phone device or device that is not mobile or mobile-optimized 3, landline phone 4, laptop computer 5, desktop computer 6, or other devices 7. This application may be accessible by users 8, including other digital machine programs 10 through an API 11 or individuals such as the jobseeker 20, job/career coach 21, mentor 22, advisor 23, peer-jobseeker 24, other individual entities 25, or a group 26 of such persons.

Figure 2:
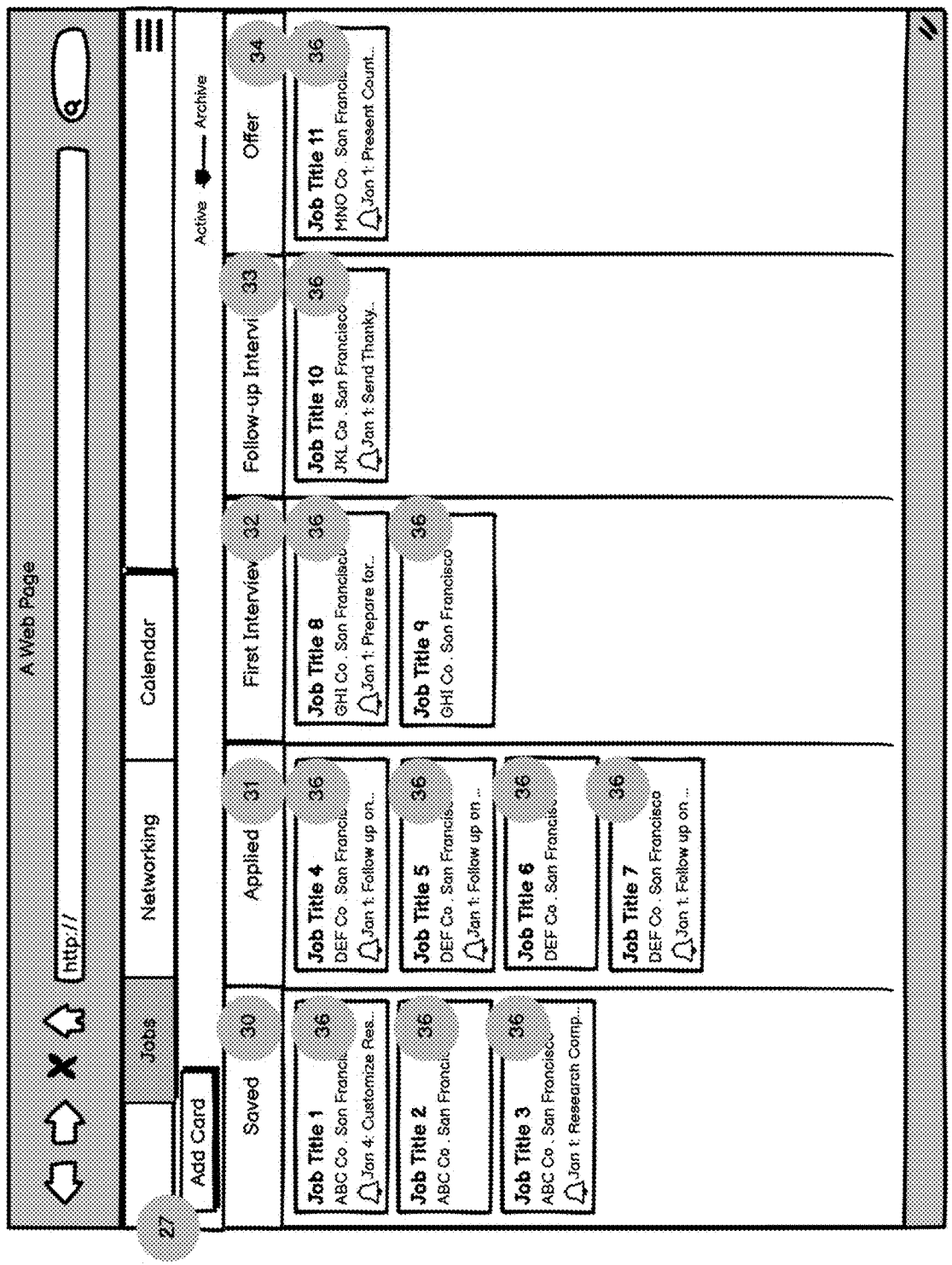
FIG. 2 is a simulated screenshot of a job applications kanban board screen in the illustrated embodiments.

Turning to FIG. 2, this application 27 encompasses a digital jobs application kanban board divided into a series of vertical or horizontal columns representing different stages of the job search process. In one application, as depicted in FIG. 2, these columns may be pre-set and fixed, including column titles such as for "Saved" job leads 30, "Applied" (opportunities for which the user 8 has submitted applications) 31, job prospects at the "First Interview" stage 32, applications at the "Follow-up Interview[s]" phase 33, and applications with an "Offer" 34 or the like. In other embodiments, users and third-party administrators may add columns to or remove columns from the board to represent different states of a job application in a job search during the setup of the digital job opportunity management application kanban board or during its use.

Job Cards

Figure 3:
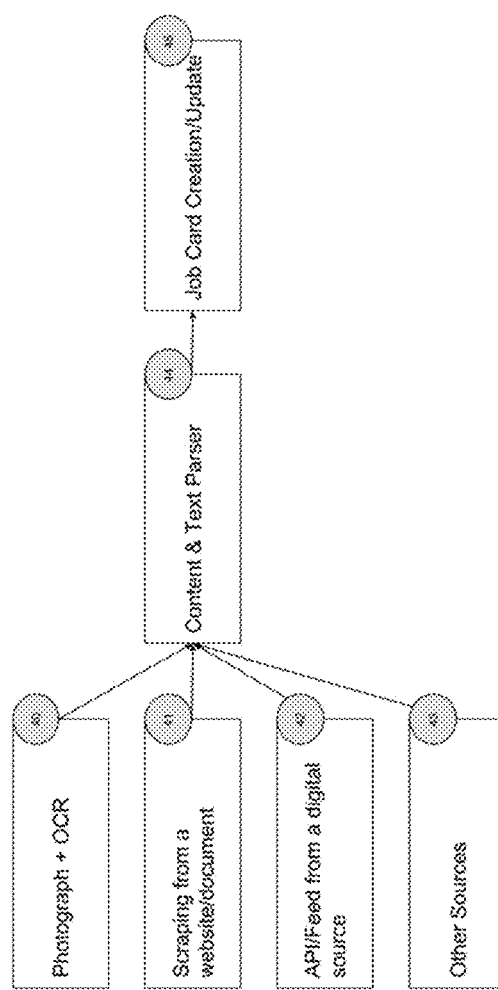
FIG. 3 is a flowchart illustrating population of job card data in the illustrated embodiments.
Figure 4:
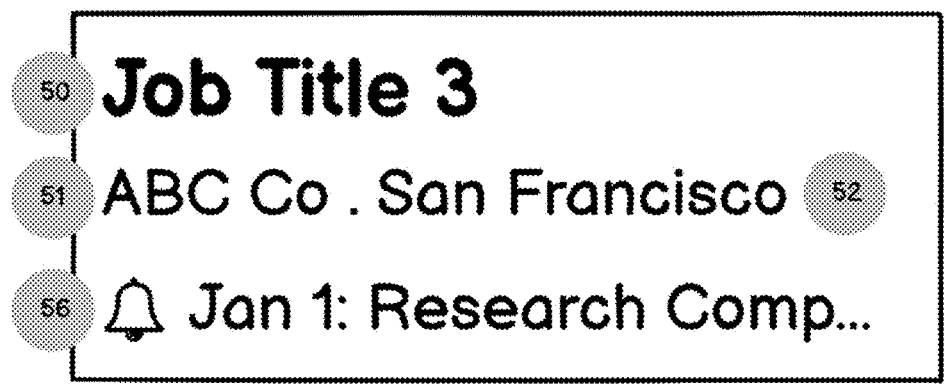
FIG. 4 is an exemplary job card used in the user interface of the illustrated embodiments.
Figure 6:
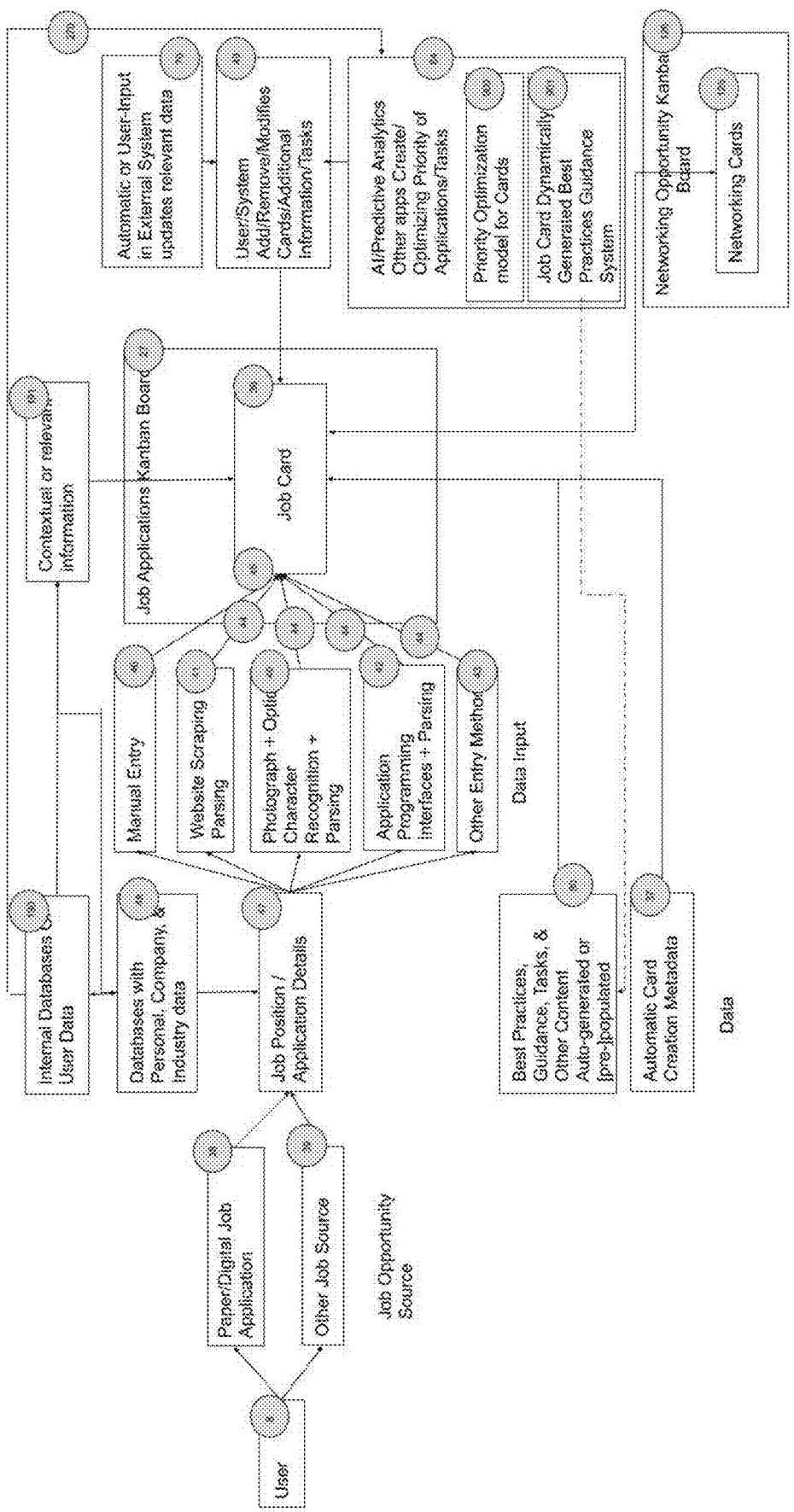
FIG. 6 is a block diagram showing creation, population, and update of job cards in the illustrated embodiments.

With further reference to FIG. 2, the user may make various entries 36 under any column 30, 31, 32, 33, 34. In various embodiments, entries 36 take the appearance of a card, sticky note, or other user interface element as will occur to those skilled in the art. In the illustrated embodiment, as depicted in FIG. 6, these entries 36, henceforth called "job cards," have associated system (or "automatic card creation") metadata 37 and may represent a potential or outstanding job opportunity or application lead. In one implementation, job cards are grouped or associated with specific networking cards as described below and as will occur to those skilled in the art. As outlined in FIG. 3, details 47 associated with these job or application leads, which may come from paper or digital job applications 38 or other job sources 39, in various embodiments will be automatically inputted from some source of a job description using technology such as a parser that may enable a user to collect the data from a photograph of a job position listing 40, scrape a website or other electronic document 41, retrieve the data via an API or other feed from a digital source 42, or obtain the data through some other means 43 as will occur to those skilled in the art. The system then parses the content 44 and outputs it 45 to be stored in job cards 36 for management via application 27. Alternatively, the user manually enters the information 46, as depicted in FIG. 6, representing information that, in one application, might include the job title 50 associated with the opportunity; the name of the company 51; the location 52 of the job opportunity; the date 53 on which the job application was posted; the source 54 of the job application; the duration 55 that the job card has been in its current phase/column; any deadlines or upcoming events 56 associated with this job or application lead and links to the application; a logo, map, salary, company rating, or other data or metadata associated with the company or job lead; and notes or comments 58 added by a user. This data might be married with additional information from sources such as databases 48 of personal, company, and industry data.

Figure 5:
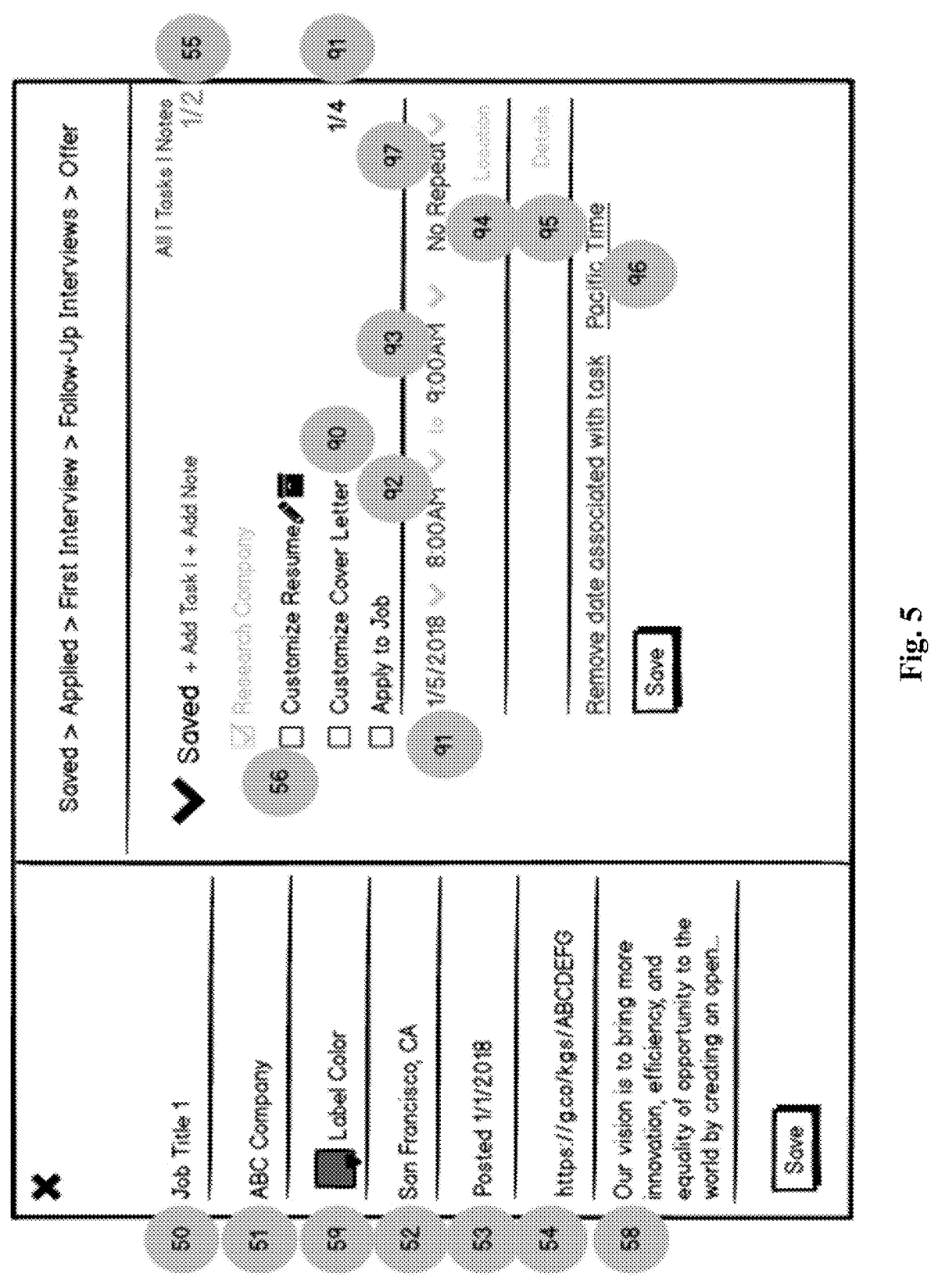

Additionally, returning to FIG. 6, in various embodiments, the user or system may add, remove, or modify existing cards and their content 49. For example, in some embodiments AI, predictive analytics, or other applications optimize 64 the priority of the tasks/applications to address. In some implementations, as depicted in FIG. 5, the user may choose to select 59 a color background or additional marker, which could be a symbol or border color, to visually distinguish cards based on the user's own organizational system, and/or the user might develop an automated rules-based system for use and/or presentation of such organizational or visually identifying markers. In a further implementation, these job cards 36 are linked to another page or modal dialog (e.g., as depicted in FIG. 5) that collects and/or hosts the aforementioned information, and possibly more information.

Figure 26:
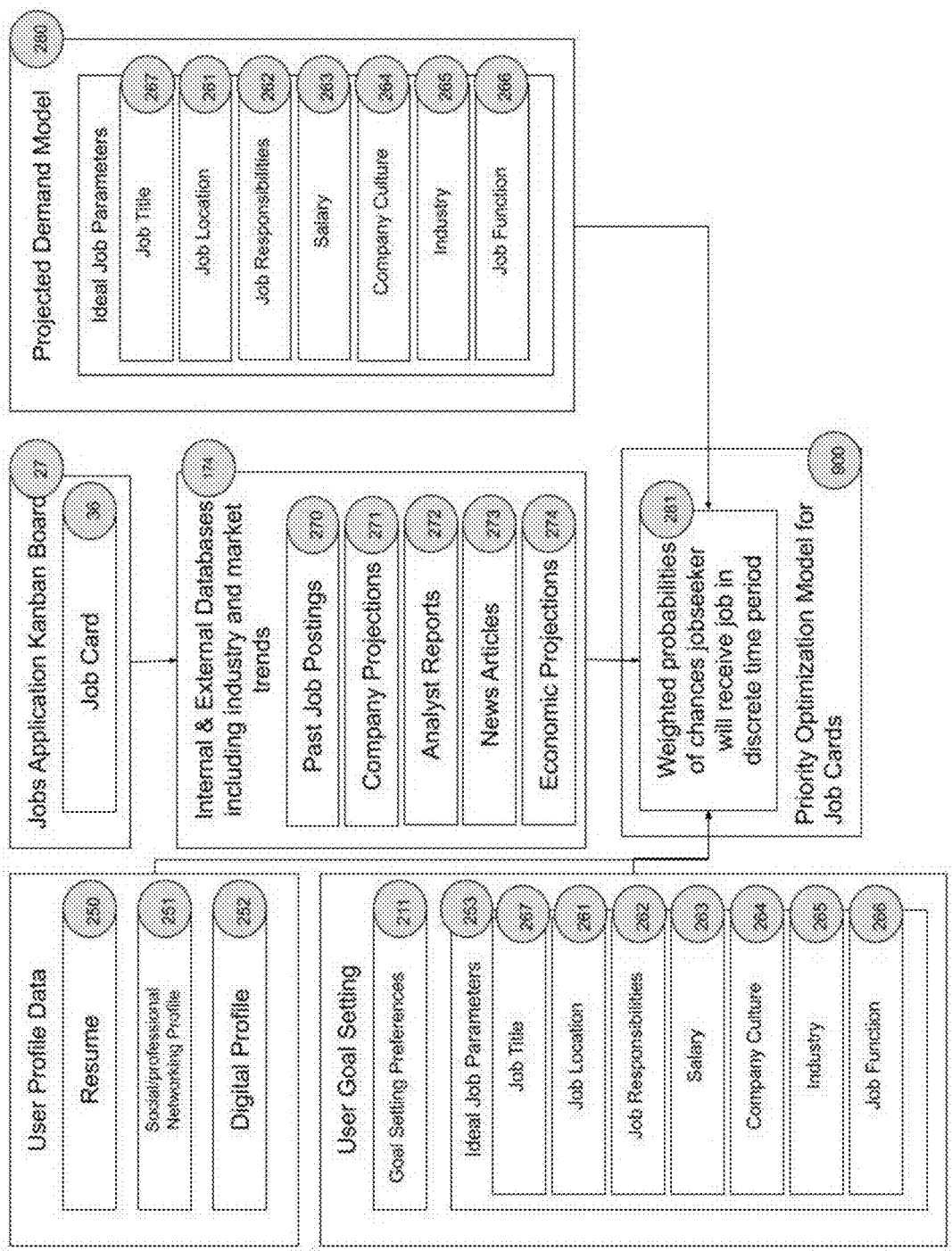
FIG. 26 is a flowchart showing job prioritization based on outside trends in the illustrated embodiments.

In one embodiment, as depicted in FIG. 26, the priority optimization model process 900 may follow the following protocol: The AI process would ingest the user's profile, which could be completed by a user 8 uploading her resume 250, linking her social/professional networking profile 251, filling out a digital profile 252 or some other representation of her background, along with her job search preferences, which could include data she puts into her goal-setting preferences 211 and her ideal job parameters 253, such as title 267, location 261, responsibilities 262, salary 263, culture 264, industry 265, function 266, and other attributes. Further, the AI process would ingest information from the jobseekers' job applications board 27, such as all the information contained in each of her job cards 36, with other content 174 from internal and external databases including industry and market trends, along with past job postings 270, company projections 271, analyst reports 272, news articles 273, and economic projections 274 to create a model 280 of the projected and year-over-year demand trends that can be decomposed by categories such as title 267, location 261, responsibilities 262, salary 263, culture 264, industry 265, function 266, and other attributes to predict hiring chances based upon macro-and-micro conditions, such as economic and temporal conditions, yielding a prioritized weighted probability 281 of the chances of the jobseeker receiving any job in a discrete time period.

Figure 27:
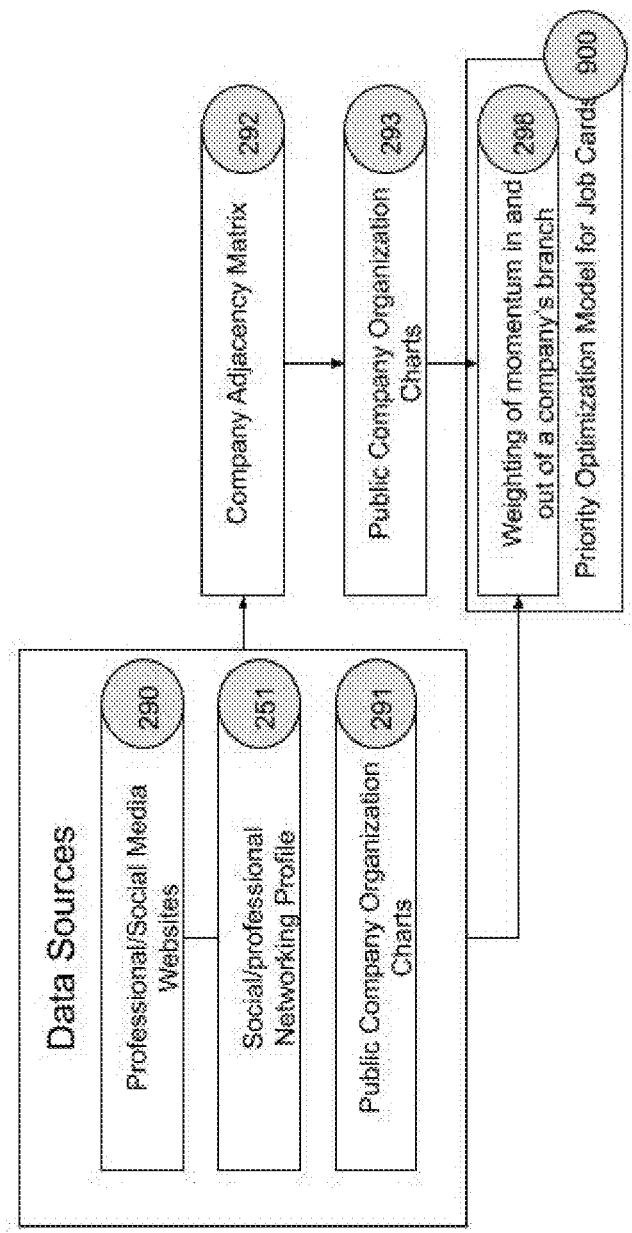
FIG. 27 is a flowchart showing prioritization of job cards based on organization momentum in the illustrated embodiments.

Another component of the priority optimization model 900, as depicted in FIG. 27, could include the ingesting of professional or social media websites 290, specifically the social/professional networking profiles 251, along with publicly available company organizational charts 291 that could be assembled into an adjacency matrix 292 and organizational chart 293 using inferences drawn from the similarity of the content in social and professional profile 251 job descriptions and strength of contact which could be deduced, for example, by the number of contacts the individuals share.

Based upon the continuous monitoring of changes in organizational chart 293 constructed by web spiders, any individual changing title or company would be flagged by the system, and a prioritized weighting of momentum 294 associated within each branch of the company's organizational chart 293 could indicate movements into and out of a division, and for movements out, represent a headcount need for an employee. Alternatively, instead of manually assessing the features relative to their hypothetical "dream" characteristics of a job, the user 8 could enter important keywords and designate whether these terms are "must haves," "should haves," "nice to haves," "shouldn't haves," and "can't have." The user 8 could then associate a specific weighting to these categories. The system could then use simple programmatic analysis (for example, applying regular expressions to the data the system has about the particular job) to identify the frequency of these expressions among the components of the job card 36. Then, based upon the frequency of the terms and the user-set parameters about the weighting of the different categories of "must haves," "should haves," "nice to haves," "shouldn't haves," and "can't haves," these weights could be derived by the user's defined category weight, set as described above, the term frequency in each job card 36. The prioritization order of job cards 36 in the jobs board 27 of user 8 could reflect these weights, where a higher position is associated with a higher weight and a higher priority.

Figure 28:
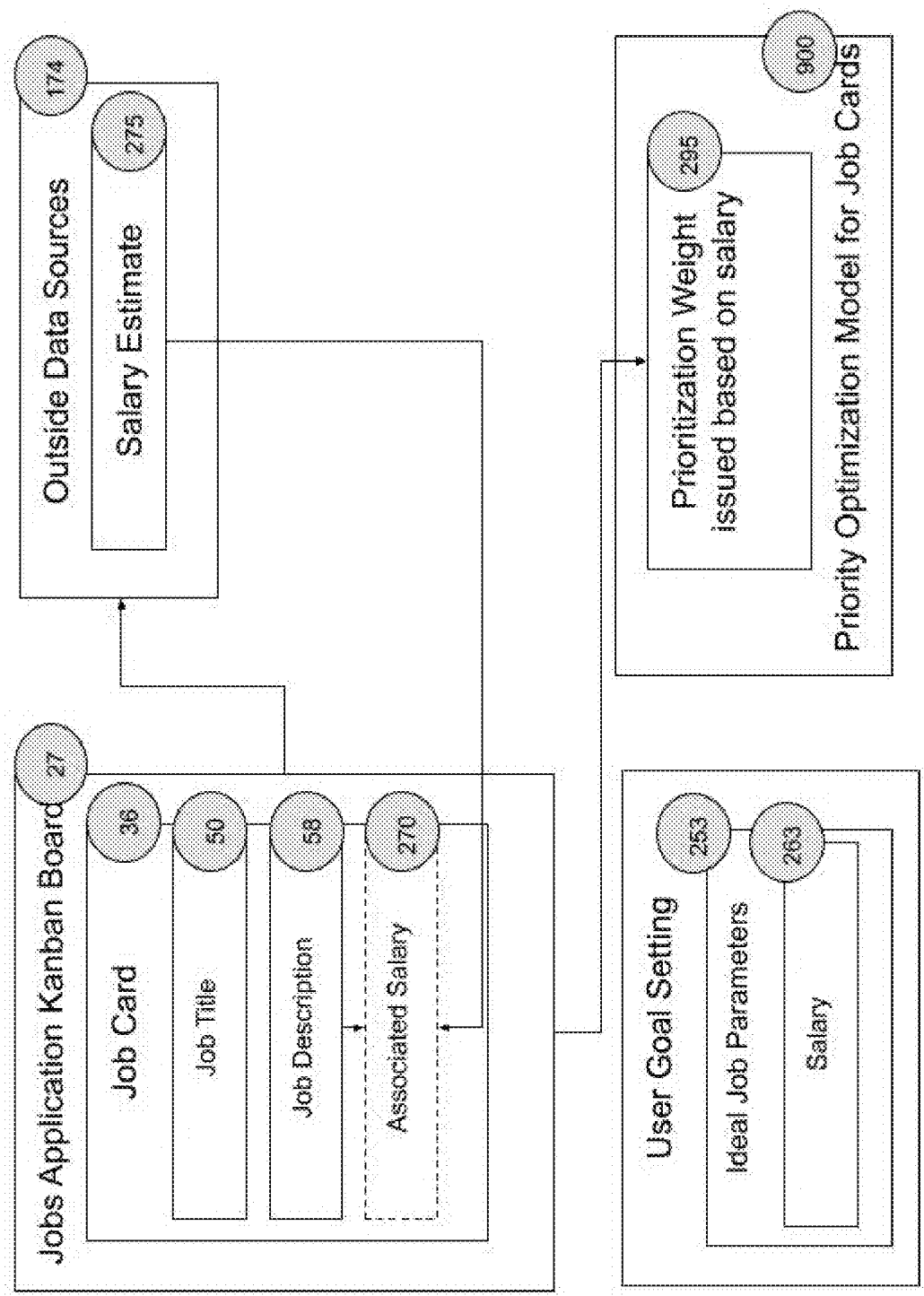
FIG. 28 is a flowchart showing prioritization of job cards based on salary in the illustrated embodiments.

The priority optimization model 900, as depicted in FIG. 28, could also account for a weight associated with how well the salary 270 associated with the job card 36 matches the salary goals 263 of the user 8. For job descriptions that do not include salary and are not parsed into card in the job description 58 into a hidden field 270 that estimates/approximates the salary/compensation, outside data sources 174 such as salary websites could provide a compensation estimate 275 for each job title 276, be weighted with a confidence interval, and be inserted into the salary field 270 associated with the job card 36. Then, based on all of the salaries gathered across all the job cards 36 in the jobs board 27, the system 900 could produce a prioritization weight 295 for each job card. This weight 295 is computed relative to the jobseeker's salary goal 263, where the closer a job's posted salary is to (or more it exceeds) this goal, the higher the prioritized weighting would be.

Figure 29:
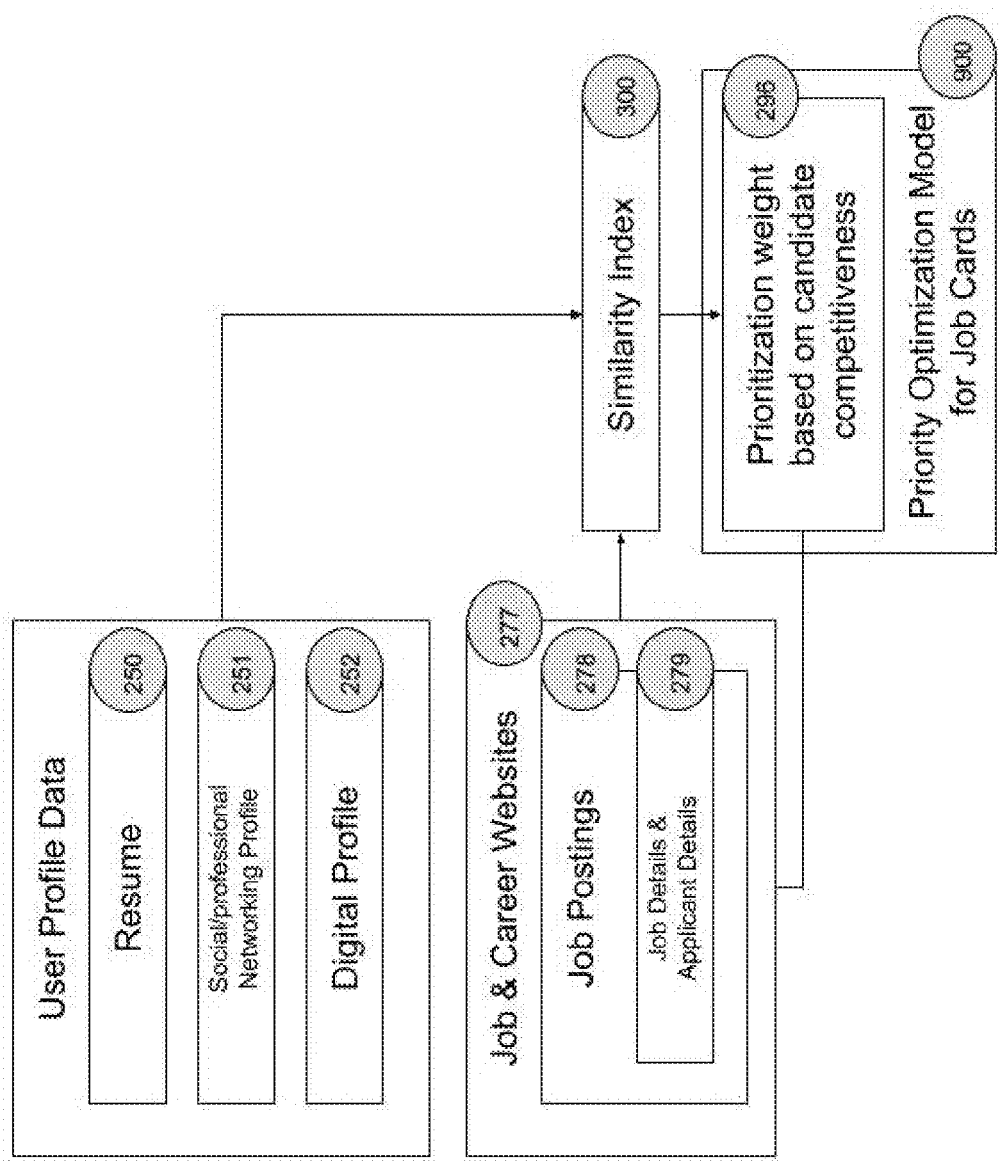
FIG. 29 is a flowchart showing prioritization of job cards based on an applicant's competitiveness in the illustrated embodiments.
Figure 30:
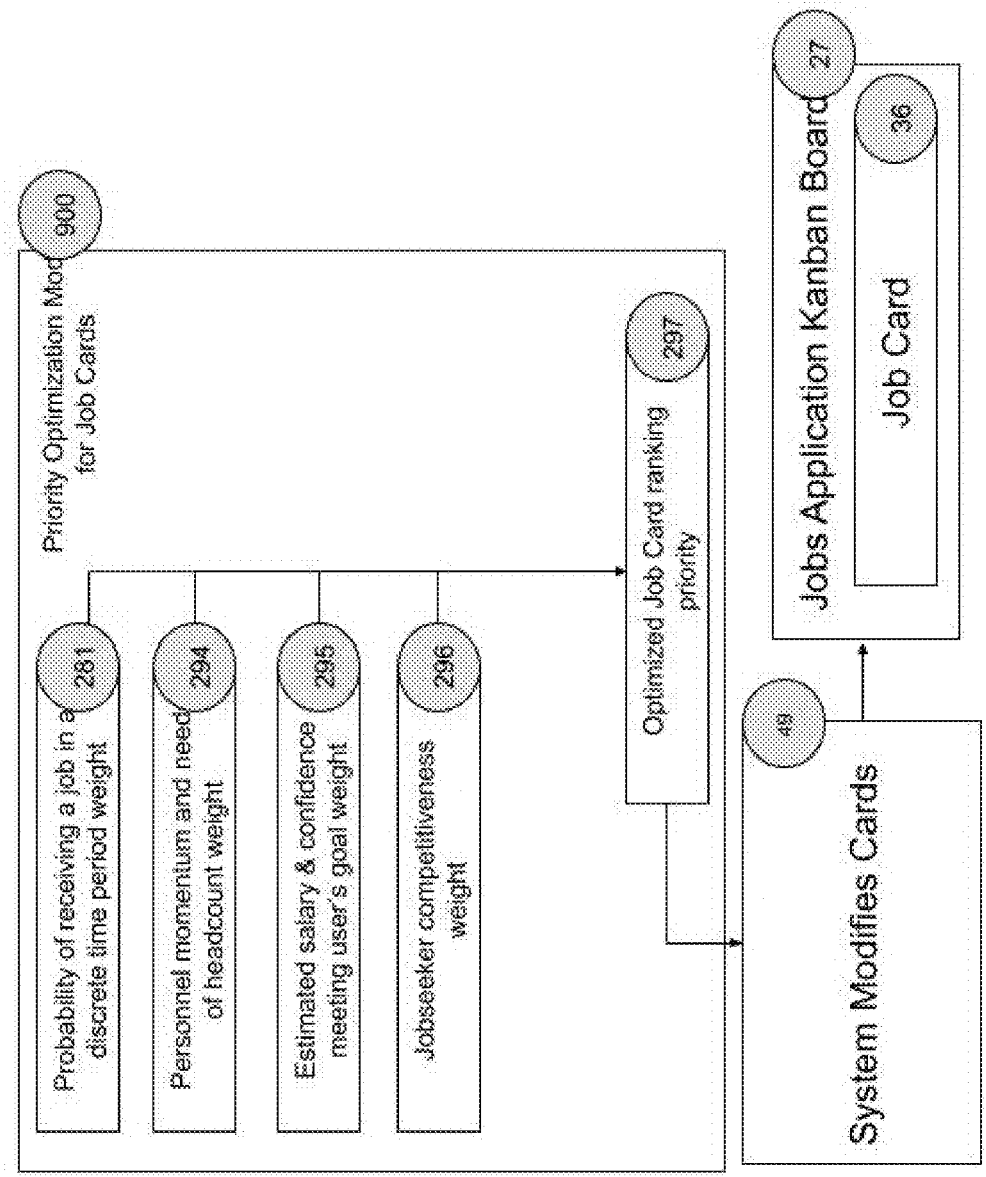
FIG. 30 is a flowchart showing prioritization of job cards based on a function of multiple metrics in the illustrated embodiments.

An additional weight 296 could be calculated based upon the competitiveness of the jobseeker with the other candidates who have applied for jobs representing this or similar roles, as depicted in FIG. 29. Websites 277 that host jobs 278 and display the number of jobseekers and their traits/skills/talents who have applied could be ingested into the system and, for each role at a company at a specific location, an average number 279 of candidates could be computed along with a similarity index 300 based upon the jobseeker's experience (determined, for example, from a resume 250, social/professional networking profile 251, a digital profile 252 or some other representation of her background). The prioritization weight 296 metric would be calculated from the number of candidates 279 who apply and the similarity 300 of the jobseeker to those candidates. The priority optimization model 900 would then calculate an optimized value 297 for each job card 36 in the job applications board 27 by creating a prioritization weighted metric 296 from values that could include a weighted probability 281 of the jobseeker receiving a job in a discrete time period; a personnel momentum and employer need weight 294 corresponding to the headcount and trends in the relevant organization, organizational branch, or market; salary weight 295 corresponding to the similarity between the posted salary and the jobseeker's salary goals; and the competitiveness weight 296 associated with the competitiveness of the jobseeker with the other candidates who have applied for this or similar roles. The output 297 would be a ranked-order presentation of job cards 36 that would be communicated to the system 49 and would be reflected in the job application board 27, as depicted in FIG. 30.

An alternative that does not include artificial intelligence, predictive analytics, or other applications to optimize 64 the priority of job leads (and the corresponding prioritization of job cards 36) that the user 8 should address, as depicted in FIG. 6, could be the manual use of filters and user-defined weights. In this potential variation, the user 8 could manually set the importance (or weighting) of discrete features associated with each job application, such as title 267, location 261, responsibilities 262, salary 263, culture 264, industry 265, and function 266, among other features. Then the user 8 could either manually assign their assessment of their features to their hypothetical "dream" features, perhaps on a continuum such as a Likert scale. These user-defined values could then be multiplied by the user's selected weight, set as described above, and the prioritization order of job cards 36 in the jobs board 27 could reflect this, where the higher weight is associated with a higher priority and higher position.

Job Card Tasks

Figure 7:
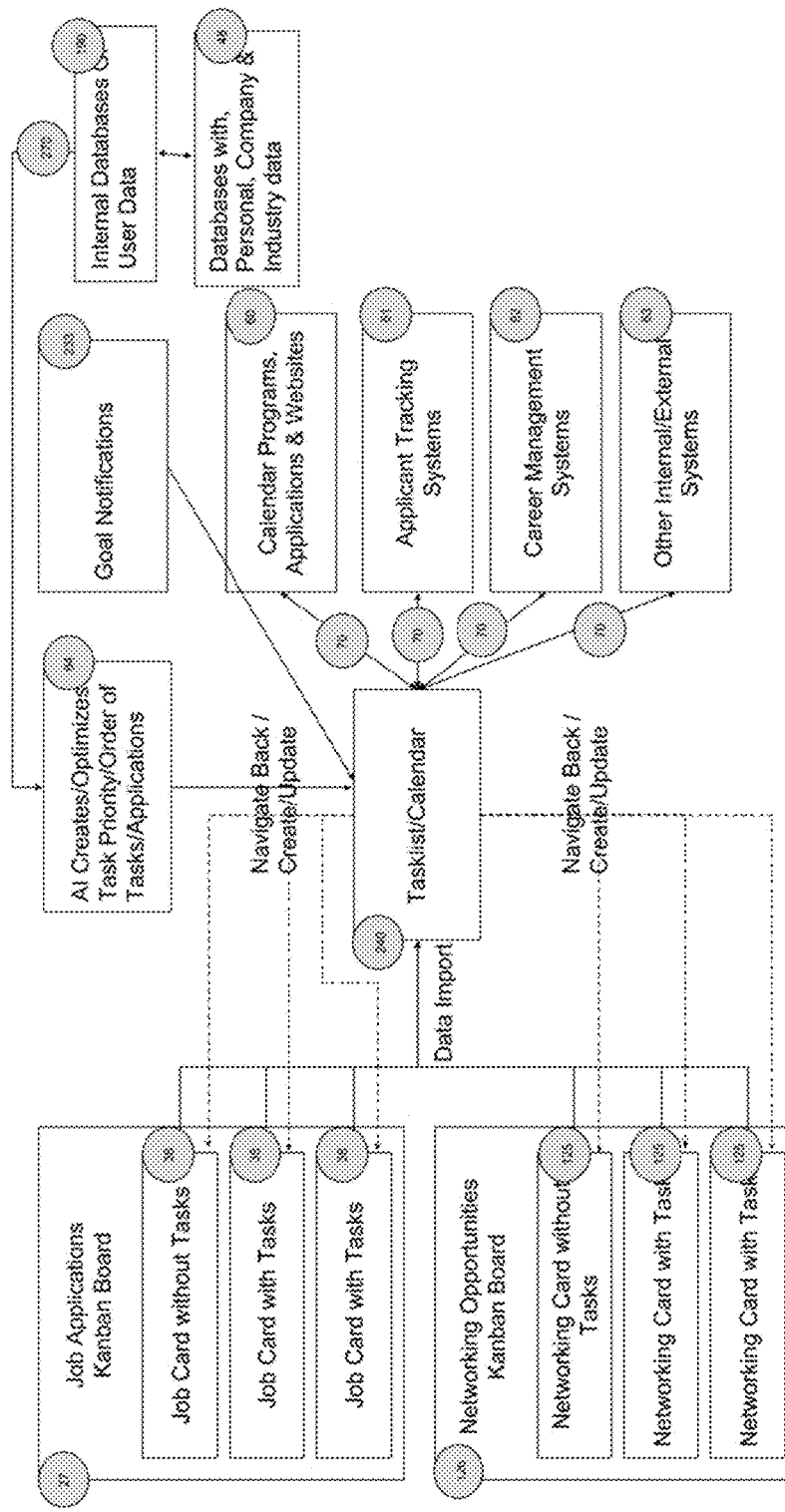
FIG. 7 is a block diagram showing integration of tasks and events in the illustrated embodiments.

The users 8 may also add, remove, or modify tasks and events associated with each job card, and in some embodiments displayed on each card. In another implementation of this application, those cards might be connected to one or more of the users' calendars 60, applicant tracking systems 61, career management systems 62, or other systems 63 as illustrated in FIG. 7. In another implementation, the user 8 may make modifications 70 to tasks or cards from their calendar or other platform and have these changes reflected in other displays in or connected to this application. Further, in yet another implementation, there might be pre-set or dynamically generated best practices, guidance, tasks/events and other content that are auto-generated or pre-populated 80 (see FIG. 6) based on a rules-based system or added by a machine-learning or similar AI application 901 as a function of the column that one or more job cards are in and other inputs, as depicted in FIGS. 6 and 7.

Additional information displayed in the job card 36 may include tasks and event data such as the title 90 of the task or event, the date or dates 91 of the task or event, the start time 92 and end time 93 of the task or event, the location 94 of the task or event, additional details 95 associated with the task or event, the time zone 96 of the task or event, whether the task or event repeats or not 97 and similar information as will occur to those skilled in the art. Based upon the preferences of the user, pre-configured tasks and events may be turned on or off either automatically, manually, or according to a predetermined default. Further, the task or event may be altered by a user or automatically altered by a computing system to indicate that the task 63 has been accomplished, and that alteration is displayed in the job card 36. Similarly, the job card 36 may indicate that the event's or task's date and time has passed, so the event or task is outstanding or overdue.

Figure 25:
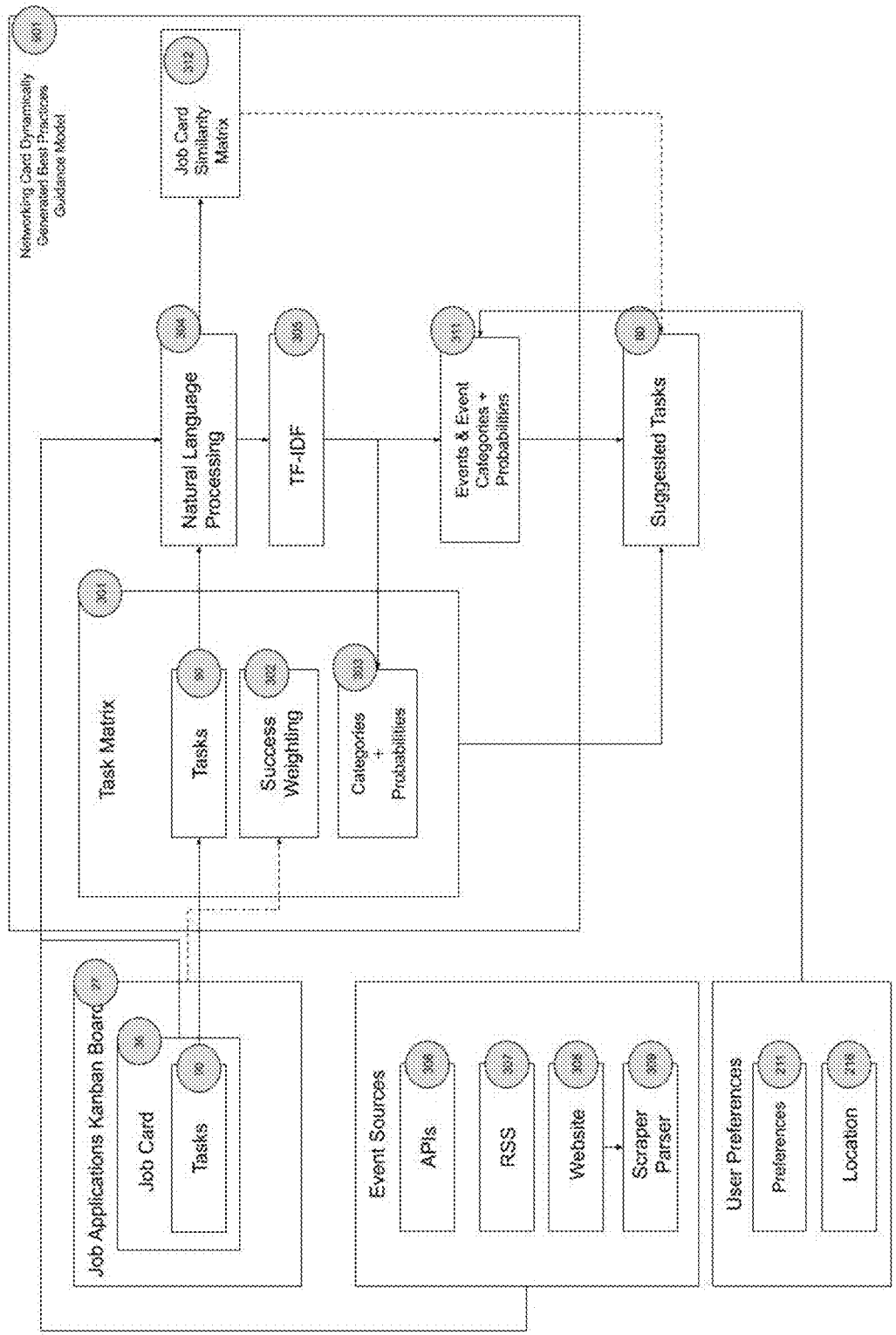
FIG. 25 is a flowchart showing job card task generation in the illustrated embodiments.

In one variation of this embodiment, as depicted in FIGS. 6 and 25, the dynamically generated best practices, guidance, tasks/events, and other content model process 901 may follow the following exemplary protocol: the AI process would ingest information from the job applications board 27 of jobseeker 8 such as all the information contained in each of her job cards 36, such as the title of the task or event 90 in the jobs application kanban board 27. These tasks 90 would be associated with a matrix 301 containing each of the tasks with a weight 302 for the farthest position to the right of their parent job card 36 on the job applications kanban board 27, representing the success. Consequently, the system can correlate the presence of a task 90 with a likelihood of success for the job card 27. The matrix 301 would also include a vector 303 of categories and probabilities that each category corresponds to the task or event. These categories in vector 303 could be derived from applying an unsupervised learning algorithm like K-means clustering based upon the application of a natural language processing technique 304, generating a TF-IDF matrix 305. Finally, a similarity matrix 312 would be generated from the job cards 36 based upon the fields contained therein, using NLP 304 to generate a TF-IDF matrix 305.

Figure 20:
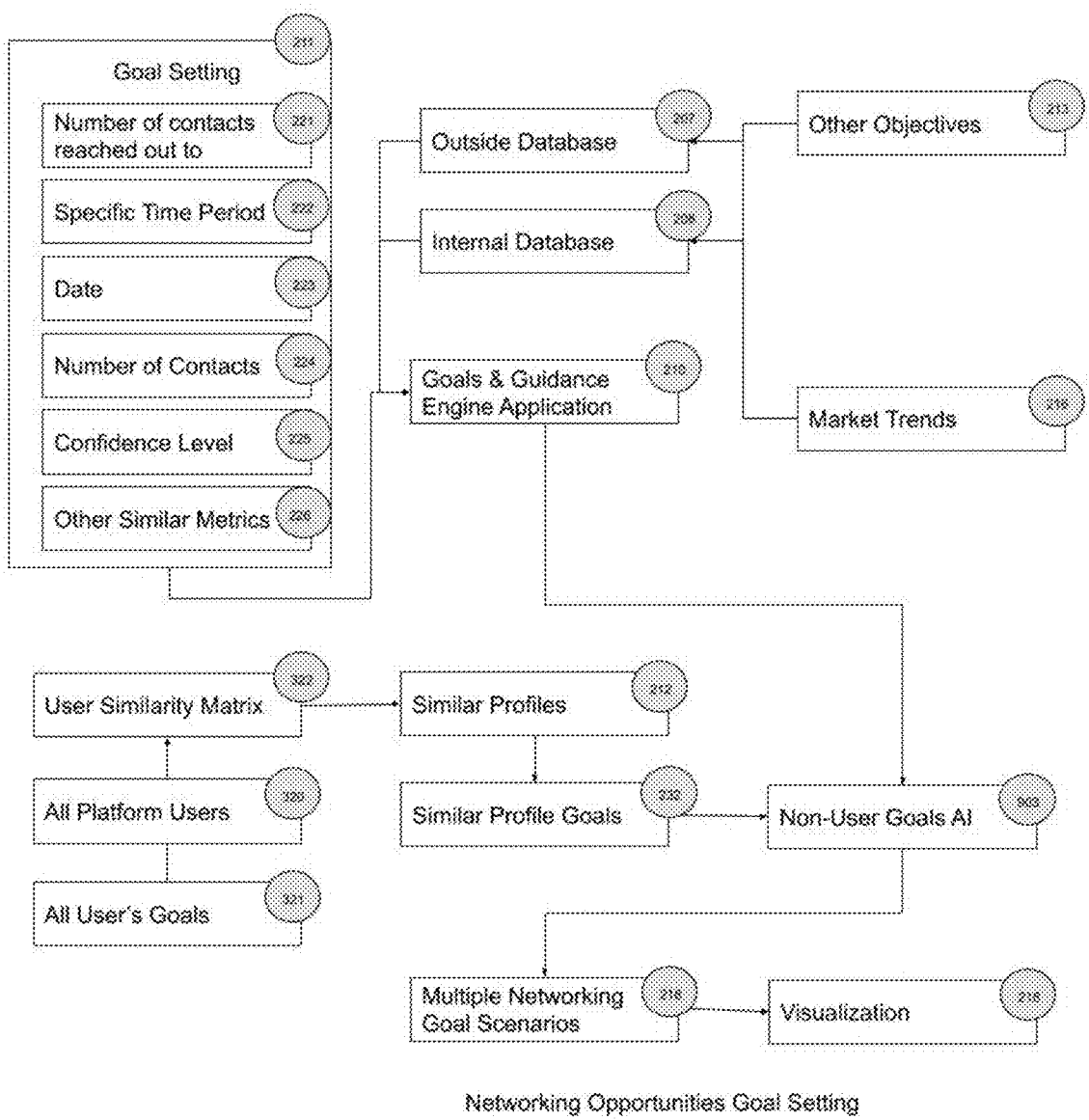
FIG. 20 is a flowchart illustrating the integration of multiple inputs to manage analytics and goals in the illustrated embodiments.

As depicted in FIG. 25, this embodiment could also ingest external data, such as events 310 like conferences, meetups, and speakers, via service provider APIs 306, RSS feeds 307, or a scraping software tool 308 that scrapes static content 309 from websites. These events 310 could then be evaluated for proximity to the jobseeker and whether the event is occurring in the near or distant future based upon her goal-setting preferences 211 and location 261. The events 310 that could meet her requirements could be classified using the models with the same clustering weights used to generate the categories 303 for her tasks 90 and produce a matrix 311 of categories and probabilities that the categories correspond to the event, similar to categories and probabilities vector 303 in task matrix 301. For tasks 90 that the system infers are not events or time-sensitive tasks from the user's job cards 36, based upon the data in the matrix 301, the model 901 would suggest a discrete number of tasks defined by the user (e.g., in goal-setting preferences 211 as shown in FIG. 20) based upon the similarities of the job card 36 and the job cards identified as similar in the job card similarity matrix 312, as depicted in FIG. 25. Those tasks 90 associated with a higher weight 302 associated with a similar job card 36 would be most likely to be suggested 80. For tasks 90 the system infers are events or time-sensitive tasks from the user's job cards 36, based upon the data in the data in the vector 311, the model 901 would suggest tasks 80 based upon the weighting 302 associated with similar job cards 36 that possess similar event or time-sensitive tasks, as depicted in FIG. 25.

Job Card Movement

Figure 8:
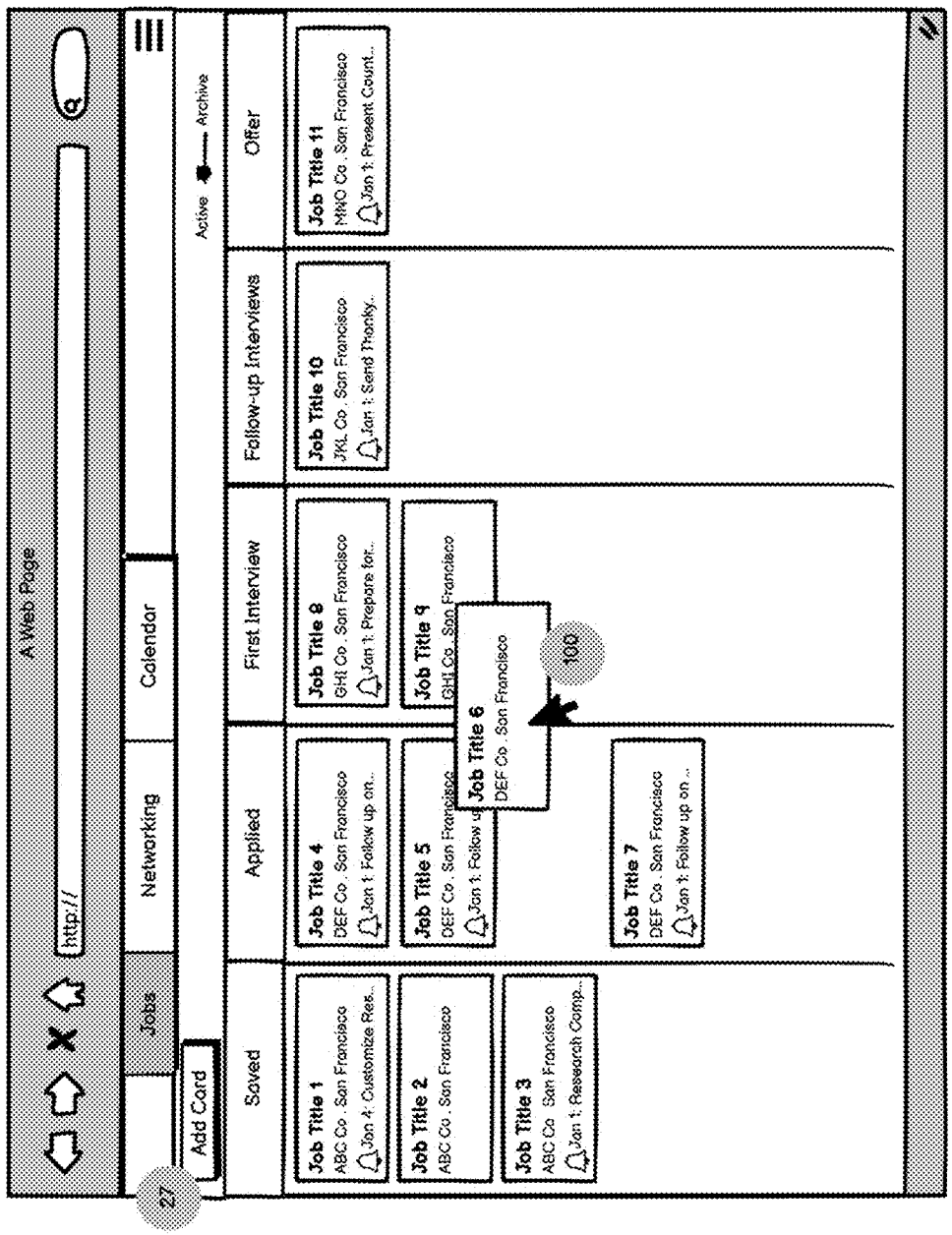
FIG. 8 is a simulated screenshot of the user interface function of moving a job card between columns in the job applications kanban board screen in the illustrated embodiments.

As depicted in FIG. 8, users can move cards from one column to another 100 by using a touchscreen, keyboard, mouse, or will some other means as will occur to those skilled in the art. This movement updates the status of the card to reflect the current status of the job application. In some applications, tasks and events may be auto-populated or created 80, marked as complete, or be subject to some other operation depending upon the column that the job card is moved from or to, as depicted in FIG. 7. Job cards do not necessarily need to be moved from one column to an adjacent column, nor do they need to always move towards an offer, as this system is representative of actual job application processes, and sometimes the application process can skip a step (for example, immediately get an offer without any interviews) or move back a step (for example, when a pending offer is rescinded and another interview is needed). Job cards 36 might be moved automatically 70 based upon data or interactions from outside sources and applications, or a user might move them manually as depicted in FIG. 7.

Job Card Auto-Update to Archive

Figure 9:
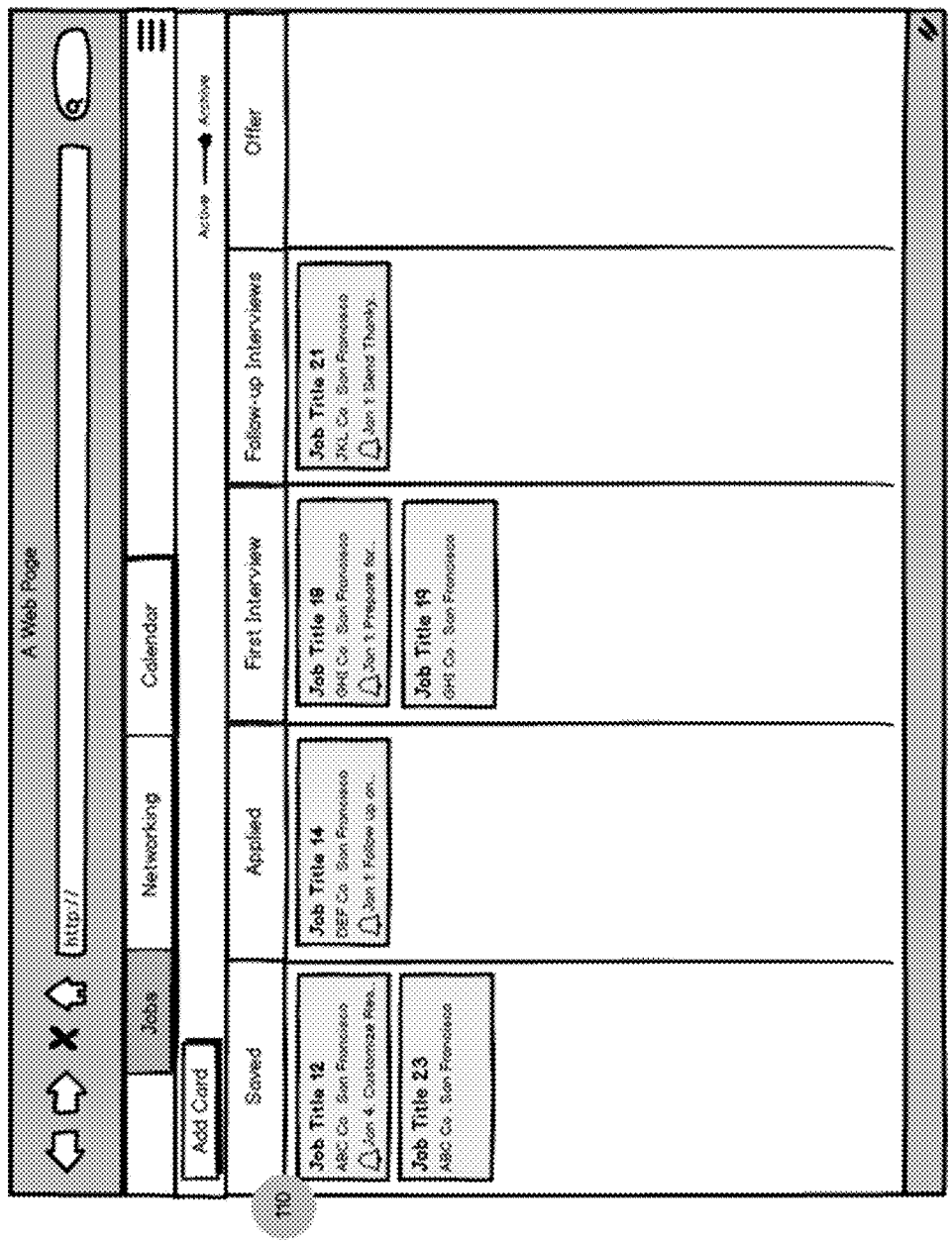
FIG. 9 is a simulated screenshot of the user interface for archived job cards in the illustrated embodiments.

Sometimes a job might be filled or the need to fill the job might go away, so in one implementation of this application, job cards could be automatically deleted (or deleted by a user after a prompt) from the digital jobs application kanban board based on outside information such as from a platform like an applicant tracking system (ATS), or be manually deleted by a user, or in another manner, and the job card, board, and connected systems are updated 70 as shown in FIG. 7. Alternatively, another implementation of this could include the archiving (instead of deleting) each job card so that there is still a record of each job card that a user has considered or acted on. These archived cards could be aggregated in another digital jobs application kanban board 110 or displayed in a table or other visualized means, as depicted in FIG. 9.

Networking Opportunities Board Users & Structure

Like the implementation described above, another example might use the same format and functionality but focus on interpersonal networking, among other alternatives, as depicted in FIG. 1. An application 0 is accessible via an electronic interactive device including but not limited to a tablet 1, connected TV 2, mobile phone device or device that is not mobile or mobile-optimized 3, landline phone 4, laptop computer 5, desktop computer 6, or other device 7. This application may be accessible by users 8, such as other digital machine programs 10 through an API 11 or individuals such as the jobseeker 20, job/career coach 21, mentor 22, advisor 23, peer-jobseeker 24, or other individual entities 25 or groups thereof 26.

Figure 10:
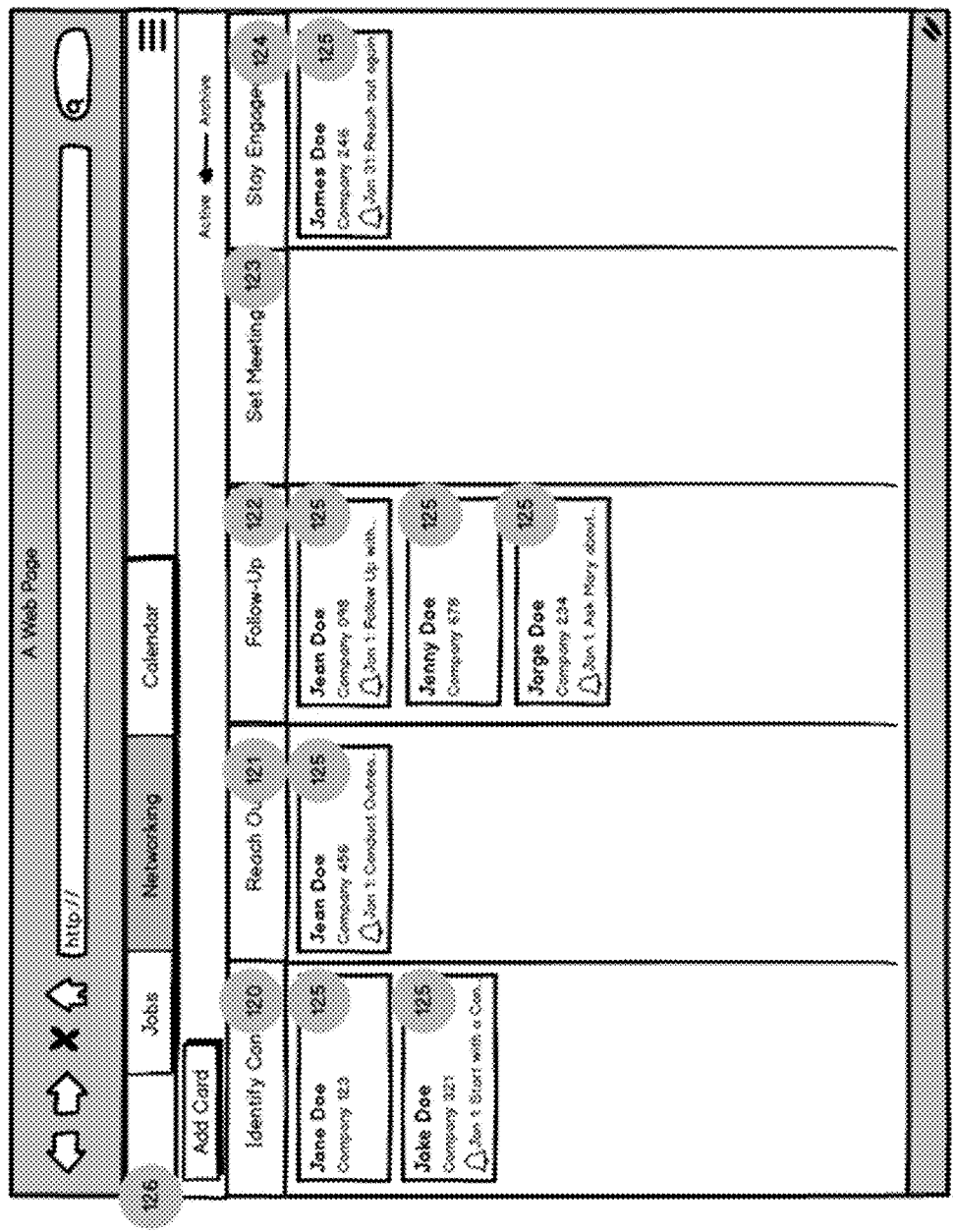
FIG. 10 is a simulated screenshot of a user interface form for manipulating data regarding networking opportunities in the illustrated embodiments.

In one application, as depicted in FIG. 10, in this networking opportunities board 126, the columns may be pre-set and fixed, including column titles such as "Identify Contact" 120, "Reach Out" 121, "Follow-Up" 122, "Set Meeting" 123, and "Stay Engaged" 124. In other instances, users or third-party administrators may remove columns or add additional columns representative of different states of a job application in a job search, either during the setup of the digital networking kanban board or during its use.

Networking Cards

Figure 11:
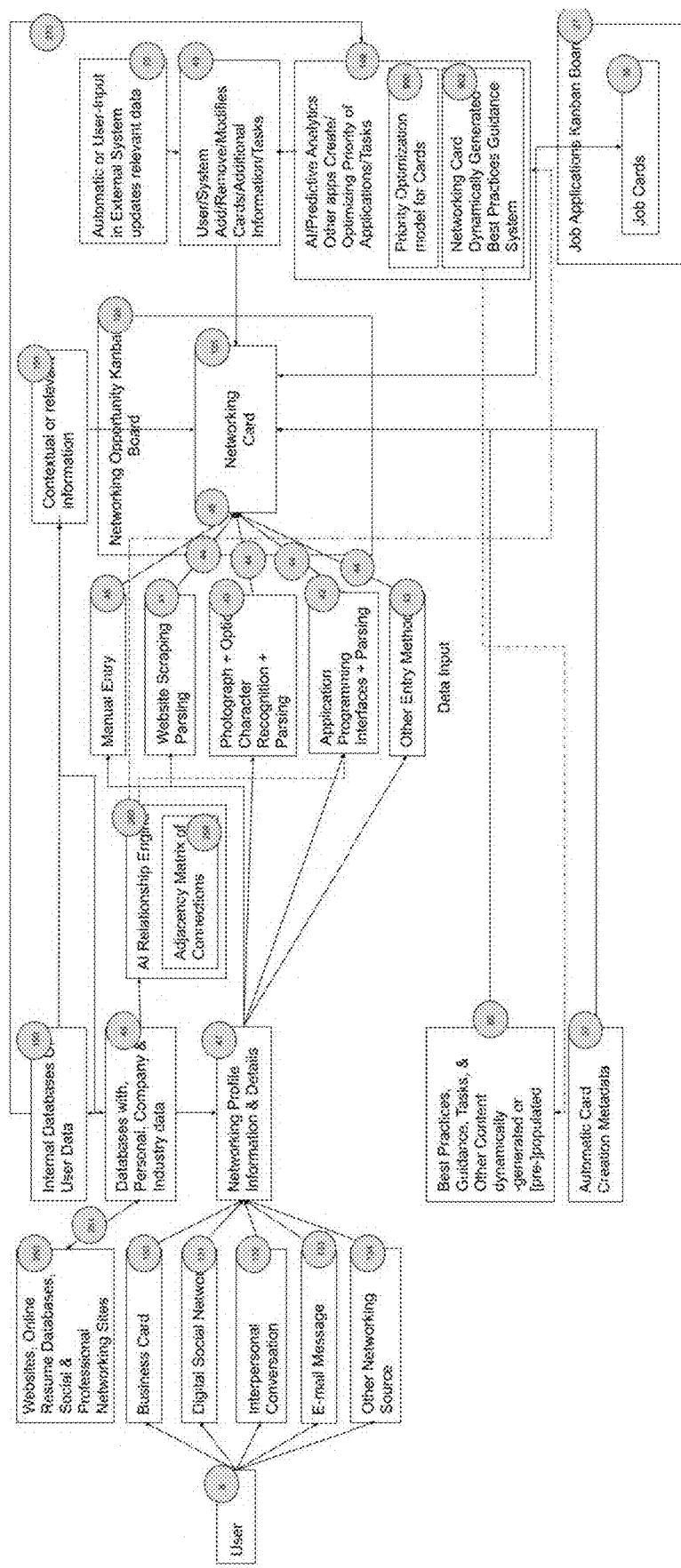
FIG. 11 is a block diagram showing creation, population, and update of job cards in the illustrated embodiments.
Figure 12:
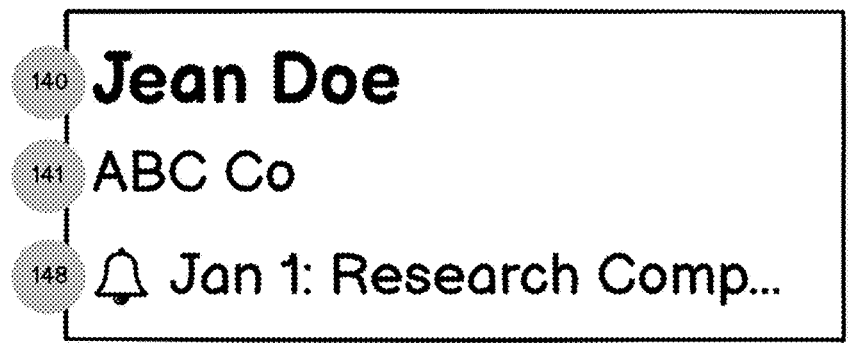
FIG. 12 is an exemplary job card for use in the networking opportunities user interface of the illustrated embodiments.

As shown in FIG. 10, the user 8 may add entries 125 under each column, which in one application takes the appearance of a card, sticky note, or other user interface element as will occur to those skilled in the art. These entries 125, henceforth called "networking cards," will have associated system metadata 37 and may represent a potential or outstanding interpersonal networking lead as shown in FIG. 11. In one implementation, networking cards 125 may be grouped or associated with specific job cards. Data associated with these networking leads may be automatically imported from a business card 130, digital social network 131, interpersonal conversation 132, e-mail message 133, or other source 134. In some of these methods, the invention scrapes and parses the networking contact data to be stored on these networking cards 125, representing information that, in the exemplary implementation depicted in FIGS. 12-13, might include the name of the individual contact 140, their workplace 141, their associated company(ies) 142, contact information including their mailing address (not shown), e-mail address 143, phone number 144, fax number (not shown), social media profile links 145, deadlines or upcoming events associated with this contact 148, and the like and might be married with additional information from other sources such as databases with company and industry data 48 (e.g., LexisNexis, LinkedIn, CrunchBase, Capital IQ, MatterMark, and others that will occur to those skilled in the art). Additionally, the user or system may add, remove, or modify existing cards 125 and their content 49.

Further, as depicted in FIG. 11, some embodiments of this platform may use AI, predictive analytics, or other applications 149 to identify and prioritize individuals to network with who either work or have worked at a company that the user 8 is applying to, is planning to apply to, or is interested in applying to, based upon information 190 from the user's goal-setting, job cards 36, or other means, where the user has shares a common experience or other connection, which may include school, degree, company, skills, work experience, and/or volunteering experience, among others, and who may be or may not be connected to the user 8 via a social media connection or in another way.

One of the many ways that this could be done is for the AI to read and analyze the user's resume and other user information 190, then identify and prioritize the factors that the user 8 may have in common with others 48, including but not limited to education, experience, and skills, and conduct a search to identify other individuals who share one or more of the factors. The search 250 may include searching a database and/or searching the Web through a crawler, spider, or API 251. A Relationship Engine AI 260 will analyze the various factors that the user 8 and other individual have in common, which could include school, degree, company, skill, work experience, and/or volunteering experience among other factors, and will weigh the relative importance of each factor to predicting the closeness of their relationship. Further, in some embodiments, predictions could be made by a predictive analytics algorithm or by a table that has a list of various factors and how they should be weighed when predicting the strength of a relationship. These predictions could then be updated using machine learning as a function of the actual results when the user 8 contacts the recommended individual for networking or when similar users obtain actual results based on similar weights. Then, through an API 42, this AI 260 would create networking cards 44 that would be advantageous for the user and help her advance toward her end goal.

Other embodiments do not include artificial intelligence, predictive analytics, or other applications to optimize 149 the priority with which the user should address networking cards 125 as depicted in FIG. 11. Instead, these embodiments enable user 8 to use filters and user-defined weights to organize and prioritize networking cards 125. In this potential variation, the user 8 could manually set the importance (or weighting) of discrete features associated with each networking opportunity, such as the person's workplace 141, associated company(ies) 142, title, function, or school, among other features. Then the user 8 could either manually assign their assessment of their features to their hypothetical "dream" features, perhaps on a continuum such as a Likert scale. These user-defined values could then be multiplied by or otherwise combined with the user's defined weight for that feature, set as described above, and the prioritized order of networking cards 125 in the networking board 126 could reflect this, where the higher weight is associated with a higher priority and higher position on the networking board 126.

Alternatively, instead of manually assessing the features relative to their hypothetical "dream" state of these features, the user could enter important keywords and designate whether these terms are "must haves," "should haves," "nice to haves," "shouldn't haves," and "can't have." The user 8 could then associate a specific weighting to these categories. The system could then use simple programmatic regular expressions to identify the frequency of these expressions among the components of the networking card 125. Then, based upon the frequency of the terms and the user-set parameters about the weighting of the different categories of "must haves," "should haves," "nice to haves," "shouldn't haves," and "can't haves," a weighting could be derived from the user's defined category weight, set as described above, and the term frequency in each networking cards 125, and the prioritization order of networking cards 36 in the networking board 126 could reflect this weighting where a higher weight is associated with a higher priority and higher position.

In other embodiments, individuals are prioritized as networking targets based upon leveraging a social networking platform to identify (e.g., in a directed-graph representation of the network) how many shared in-degrees and out-degrees an individual has with other individuals and to evaluate the strength of the potential connection with the user in question based upon these shared connections. As depicted in FIG. 11, an adjacency matrix 268 could be assembled from these data, where a weighted average of shared connections puts a first weight on in-degree connections and a second weight on out-degree connections, could be then developed, and a prioritization scheme could be implemented as a function of the adjacency matrix 268 and these weights.

Figure 13:
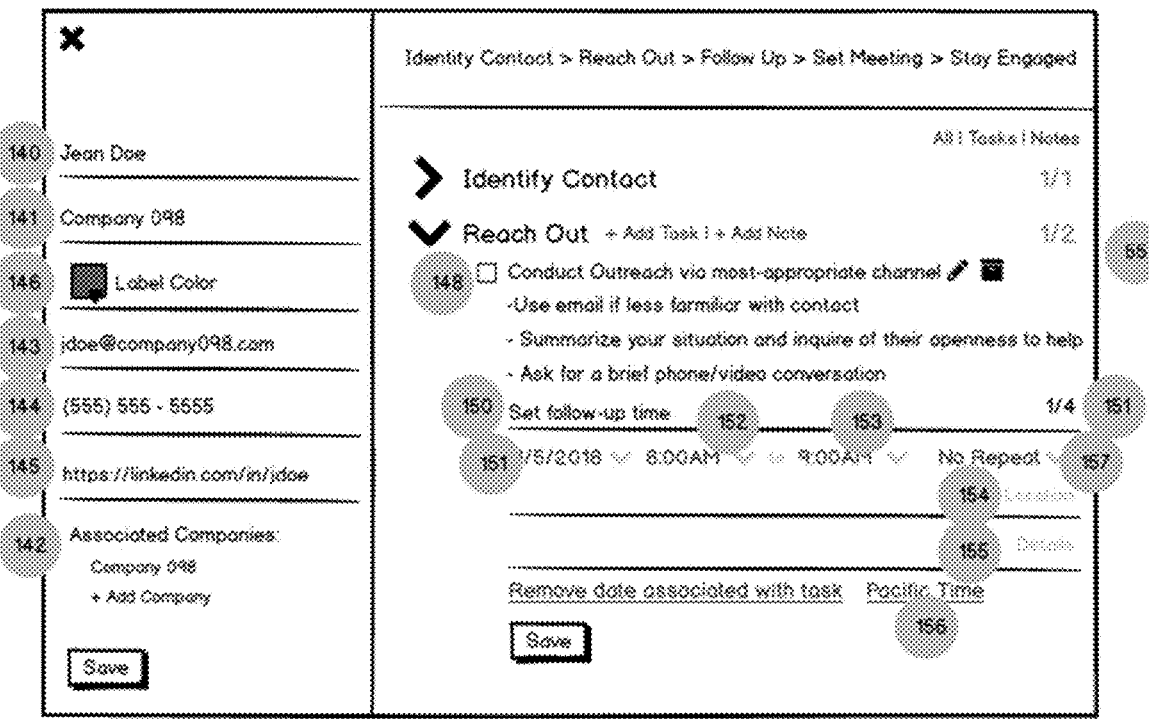
FIG. 13 is an exemplary user interface dialog for networking contact card data in the illustrated embodiments.

In another implementation, as depicted in FIG. 13, the user may choose to select a color background or additional marker which could be a symbol or border color 146 to visually designate cards based on their own system or to develop an automated rules-based system for the application of these visual-identifying markers. In a further implementation, these networking cards link to another page or modal dialog, as depicted in FIG. 13, that hosts the aforementioned information, or possibly more information as in that implementation. Sometimes the data on the networking card in the digital networking kanban board might be truncated.

Networking Card Tasks

As depicted in FIG. 13, users may also have the ability to add, remove, or modify tasks and events or other functions associated with each networking card and displayed on each card, which in another implementation of this application, might be connected to one or more of the users' calendars 60, applicant tracking systems 61, career management systems 62, or other systems 63 as depicted in FIGS. 7 and 11, applicant tracking systems, career management systems, or other systems with which the user 8 may or may not be associated. In another implementation of this system, the user or users may be able to make modifications to tasks or cards 70 from their calendar or other platform and have these changes reflected in this application.

In other implementations, user 8 uses a form to populate general tasks, recommendations, advice, or to-dos or other strategies that she wants to try out in different cards. Then the system could use a random number generator to randomly sample from all the tasks, recommendations, advice, or to-dos that the user 8 input previously and propose content, such as a suggested task or advice to an event 56 of a networking card 125 and task list, where the user 8 could accept or dismiss the suggested content. Finally, based upon the acceptance or dismissal of the advice, additional weight could be given to content where the user 8 previously accepted the content into the event and task list 56 of her networking cards 125. This would allow for the most accepted suggestions to have the possibility of appearing more frequently.

Further, in another implementation of this application, there might be pre-set or dynamically generated best practices 80, guidance, tasks/events, and other content that are auto-generated or pre-populated based on a rules-based engine or a machine-learning or similar AI application associated with each networking card with respect to the particular column that it is in, as depicted in FIG. 11. As shown in FIG. 13, tasks and events in the system may include additional information displayed in the networking card that includes information such as the title of the task or event 150, the date or dates of the task or event 151, the start time 152 and end time 153 of the task or event, the location 154 of the task or event, additional details 155 associated with the task or event, the time zone 156 of the task or event, an indication 157 whether the task or event repeats or not, and so forth. Based upon the preferences of the user, these pre-set tasks and events may be turned off or back on. Further, the task or event may be altered by a user or automatically altered by a computing system to indicate that the task has been accomplished and is displayed as such 63, or that the task or event's date and time has elapsed and is outstanding or overdue. In another implementation of this application, notifications may be dispatched in the case of an overdue task or event.

Figure 31:
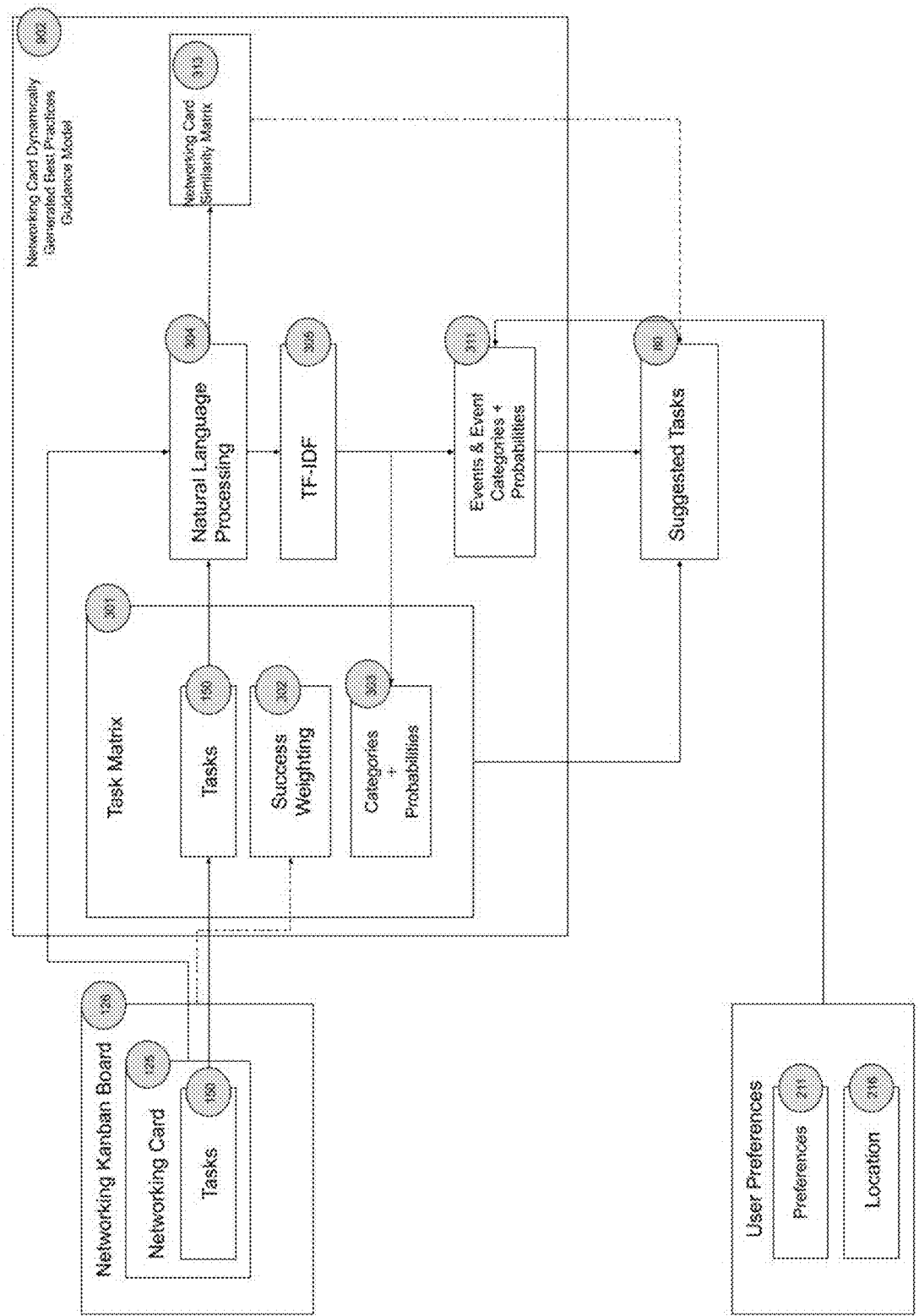
FIG. 31 is a flowchart showing networking card tasks generation in the illustrated embodiments.

In one embodiment of this invention, as depicted in FIGS. 11 and 31, the dynamically generated best practices, guidance, tasks/events and other content model process 902 may follow the following protocol: the AI process would ingest information from the networking board 126 of jobseeker 8 such as all the information contained in each of her networking cards 125—particularly the title 150 of the task or event in the networking kanban board 126. These tasks 150 would be associated with a task matrix 301 containing each of the tasks with a weight 302 for the farthest position to the right of their parent networking card 125 on the networking kanban board 126, representing the success. Consequently, the system could infer the degree of success for the networking card 125 from the presence of a task 150 and the data in task matrix 301. Task matrix 301 would also include a vector 303 of categories and probabilities that the category corresponds to the task or event. This vector 303 of categories could be produced by applying an unsupervised learning algorithm like K-means clustering to the output of a natural language processor 304 and generating a TF-IDF matrix 305. Finally, a similarity matrix 313 would be generated from the networking cards 125 based upon the fields contained therein, using NLP 304 to generate the TF-IDF matrix 305. For tasks 150 that the system infers from the networking cards 125 of the user 8 (that is, based upon the data in matrix 301) are not events or time-sensitive tasks, the model 902 would suggest a discrete number of tasks defined by the preferences 211 of the user 8 based upon the similarities between the networking card 125 and the networking cards 125 identified as similar in the networking card similarity matrix 313, as depicted in FIG. 31. Those tasks 150 associated with a higher weight 302 associated with a similar networking card 125 would be most likely to be suggested 80.

For tasks 150 which the system infers (based upon the data in the vector 311) are events or time-sensitive tasks from the user's networking cards 125, the model 901 would suggest tasks 80 based upon the weighting 302 associated with similar networking cards 125 that possess similar event or time-sensitive tasks, as depicted in FIG. 31.

Networking Card Movement

Figure 14:
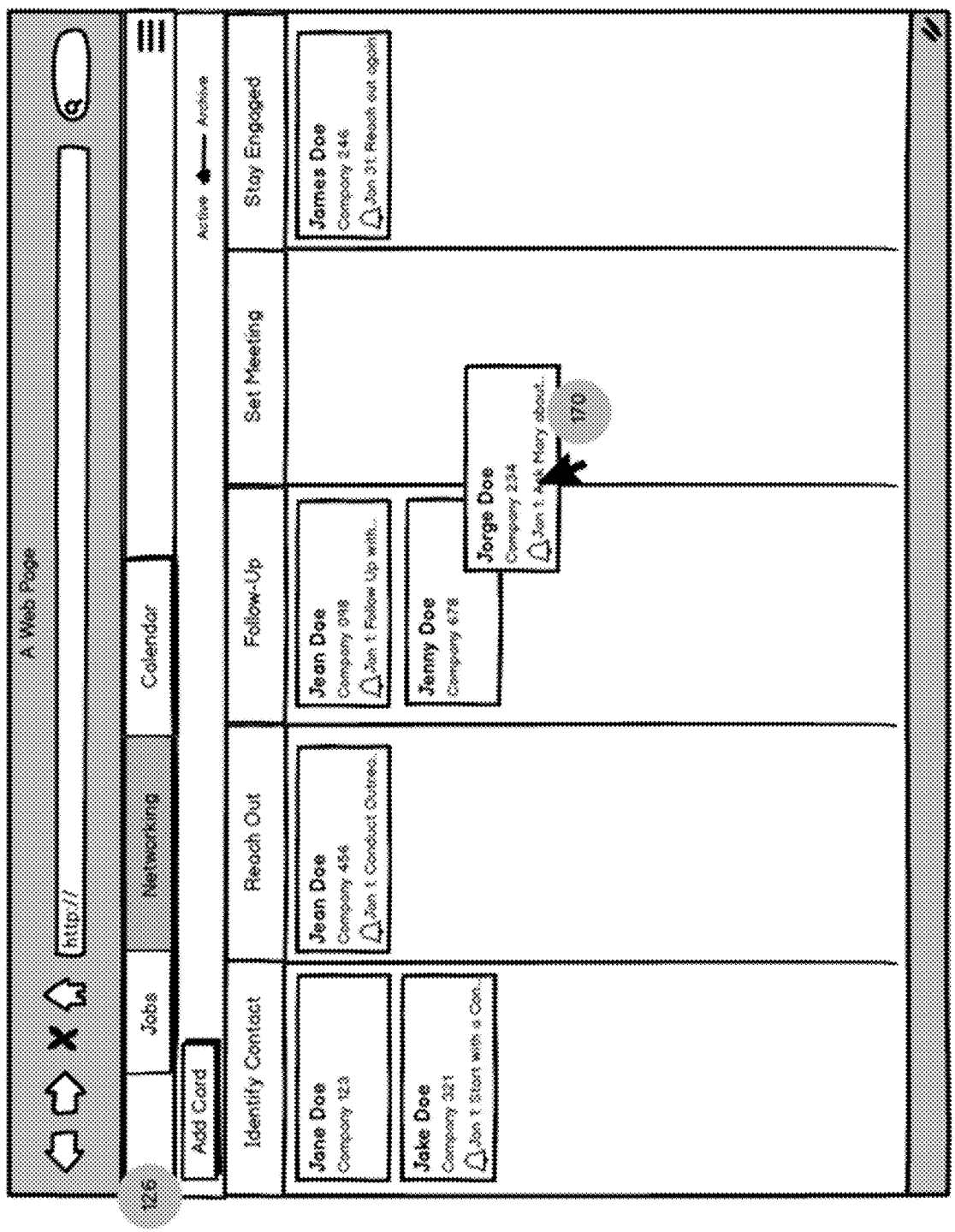
FIG. 14 is a simulated screenshot of the user interface functions related to moving a networking contact card between columns in the networking opportunities kanban board screen in the illustrated embodiments.

As depicted in FIG. 14, users could move cards from one column to another via input 170, such as touchscreen, keyboard, mouse, or some other means, to update the status of the card to reflect the current status of the networking opportunity. In some embodiments of this feature, tasks and events may be auto-populated, created, or some other operation 80 undertaken depending upon the column that the job card is moved to, as depicted in FIG. 11. Networking cards do not necessarily need to be moved from one sequential column to another, nor do they need to always move towards a meeting, as this system is representative of the networking process, and sometimes the networking process can skip a step (for example, entering the system after a meeting) or move back a step (where further follow-up is needed after an initial meeting is cancelled). Networking cards might be moved automatically based upon data or interactions from outside sources and applications 60, or they might be moved manually by one of the users, as depicted in FIG. 11.

Networking Card Auto-Update to Archive

Figure 15:
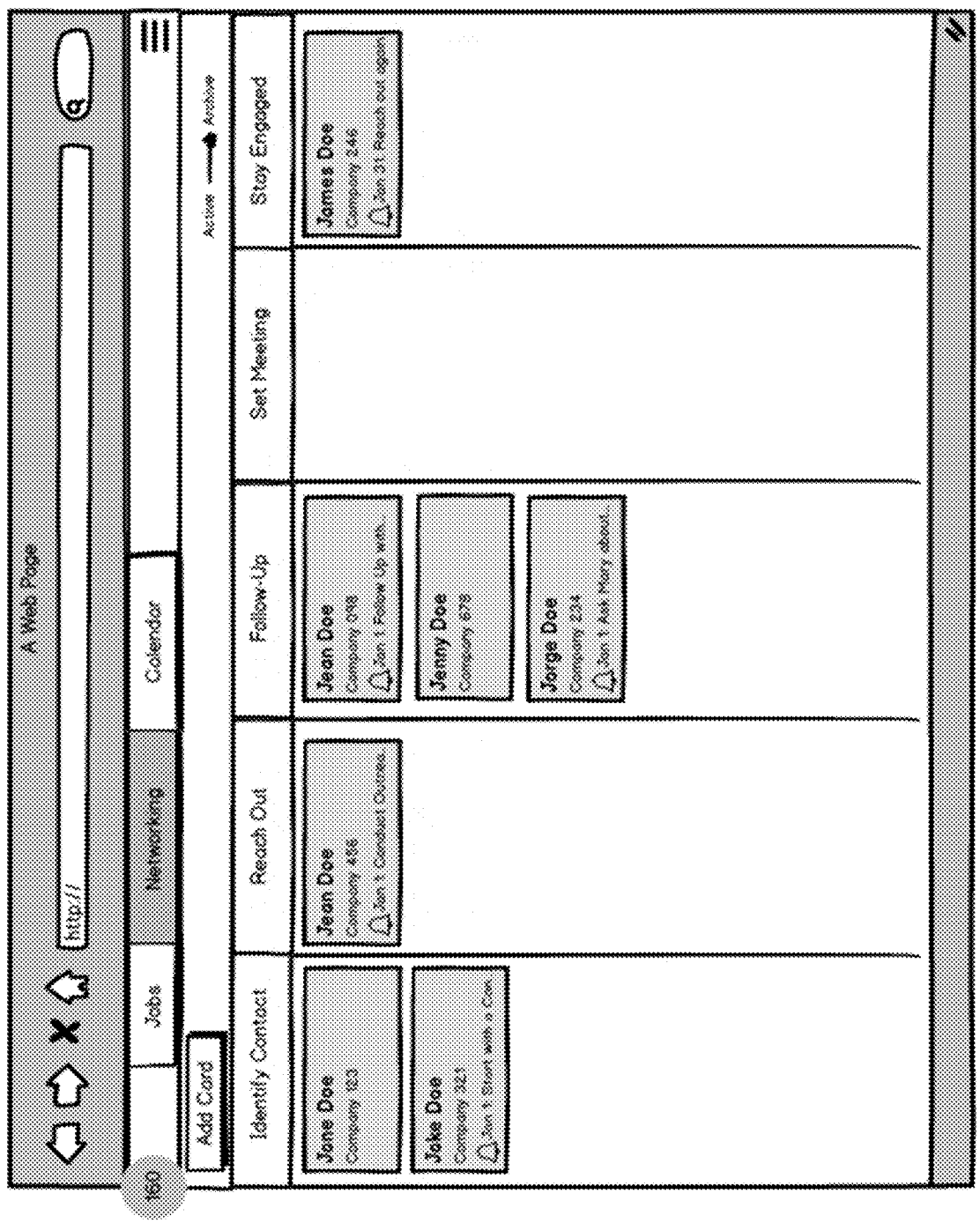
FIG. 15 is a simulated screenshot of the user interface for manipulating archived networking opportunity data in the illustrated embodiments.

Turning to FIG. 15, sometimes a connection might be unresponsive or no longer wish to communicate. Consequently, in one implementation of this application, networking cards could be deleted from the digital networking kanban board based on outside information from another platform, including without limitation a social media platform (such as when the other person "un-friends" the user), or be manually deleted by the user, or be deleted by a user after an automatically generated prompt. Alternatively, another implementation of this could include the archiving of each networking card so that there is still a record of each networking card that a user has considered or acted on. These archived cards could be aggregated in another digital networking kanban board 160 or displayed in a table or other visualized means.

Analytics

Figure 16:
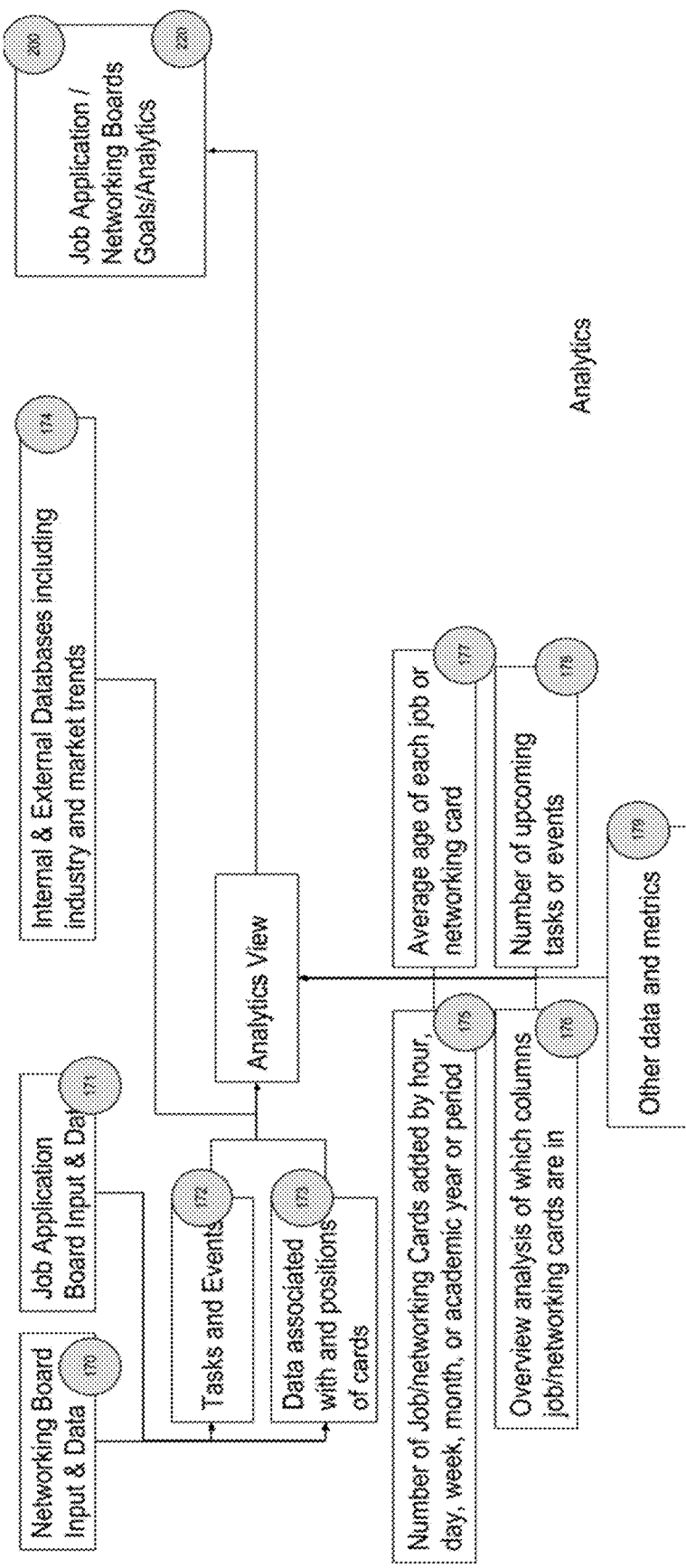
FIG. 16 is a flowchart illustrating the integration of multiple inputs to manage analytics and goals in the illustrated embodiments.
Figure 17:
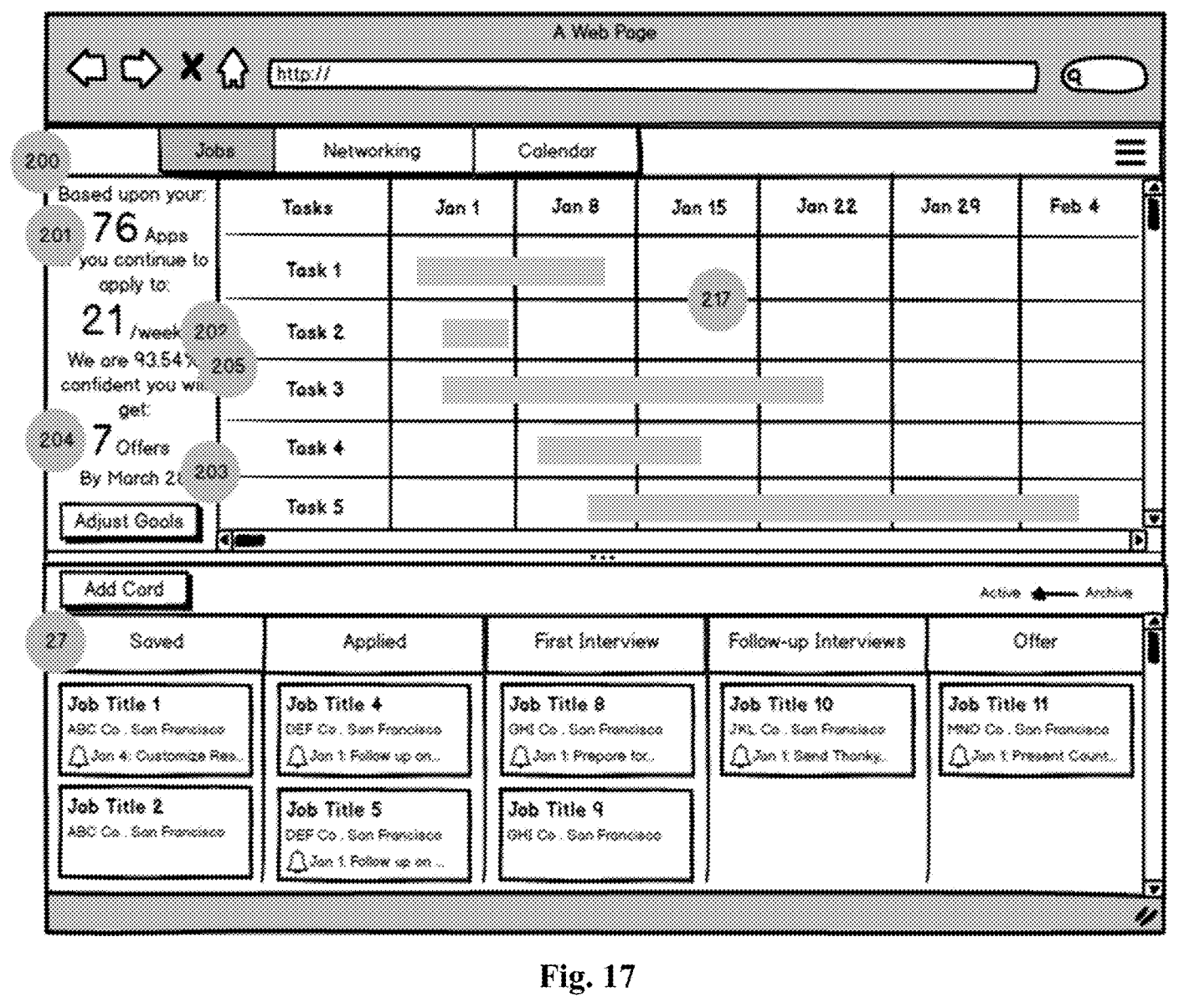
Figure 19:
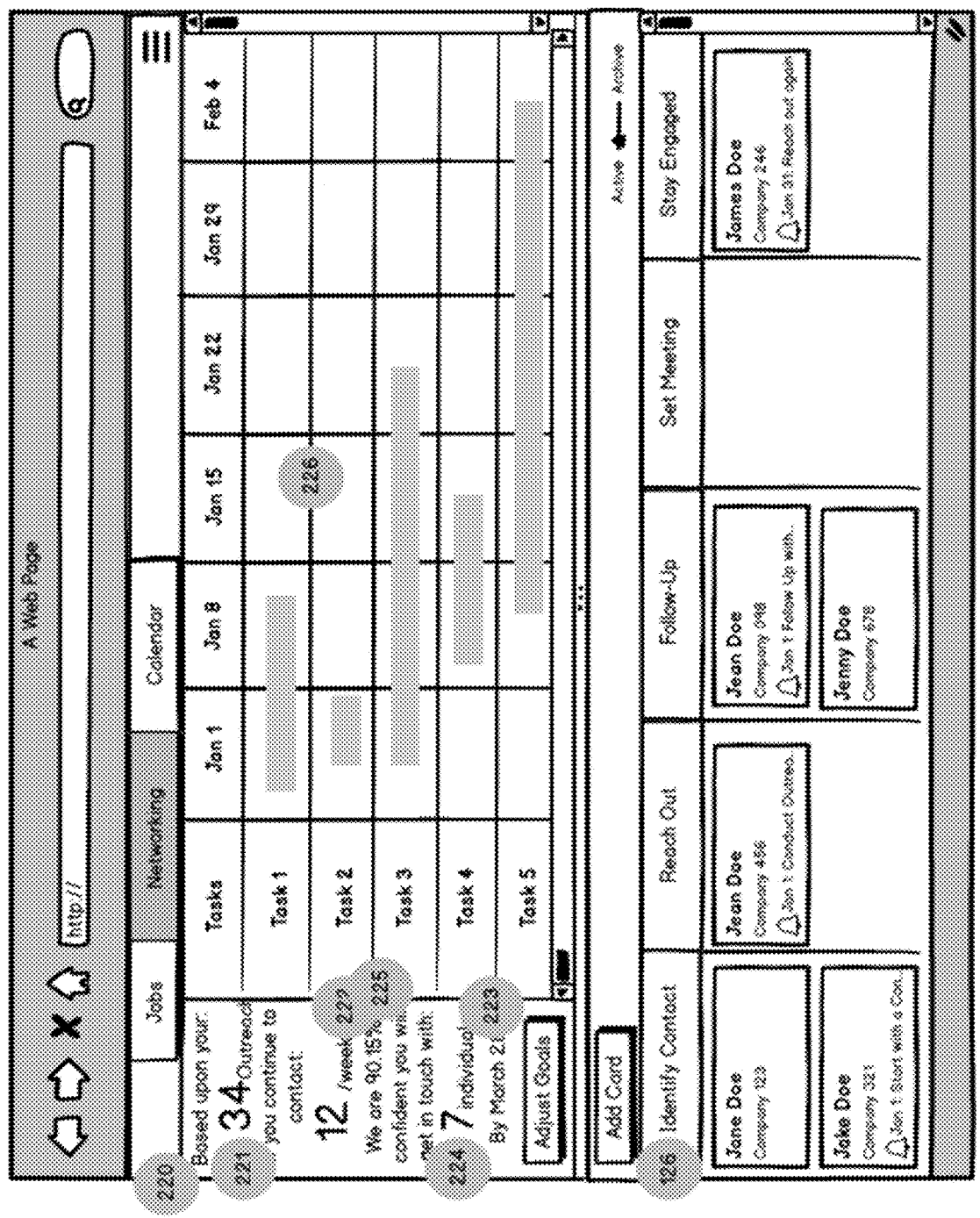
FIG. 19 is a simulated screenshot of a second visualization interface for goals and recommendations in the illustrated embodiments.

Additionally, in another implementation of this application, as depicted in FIG. 16, data from one and/or many users of the digital kanban job application board 171 and networking kanban board 170 may be gathered and aggregated to provide further insights to users 8. These analytics could be aggregated from individual tasks and events 172 associated with job and network cards, could be aggregated from the data in and position of the actual job and networking cards themselves 173 including other content from internal and external databases 174 such as industry and market trends or comparisons across many users. In one implementation, analytics might include the number of job/networking cards added by hour, day, week, month, academic year, or other period 175, an overview analysis of which columns job/network cards are in 176, the average age (on a column- or board-wide basis) of each job card or networking card 177, number of upcoming tasks or events 178, and other data and metrics and also how the status or trends compare to the user's or users' goals 179, and is displayed, for example, as shown in FIGS. 17 and 19.

Embedded Additional Contextual Information

In a further implementation, data from outside 48 or internal databases 190 relating to each job card 36 or networking card 125 could be included in the user interface depiction of card 191 where it presents contextual or relevant information, as shown in FIGS. 6 and 11. For example, if a jobseeker chooses to apply for a job in a specific role at a specific company, salary data for that role, satisfaction ratings for that company, potential interview questions, and other data could be automatically embedded into the card 36, 125 for that job opportunity or networking connection. Further embodiments of this feature could show the user how competitive she is compared to other candidates who are applying for the same or similar role (with the same employer or others), and/or to applicants who have successfully pursued jobs in the same or similar roles, leveraging outside and internal databases to obtain, aggregate, and/or display this information.

Job Goals Setting

Figure 18:
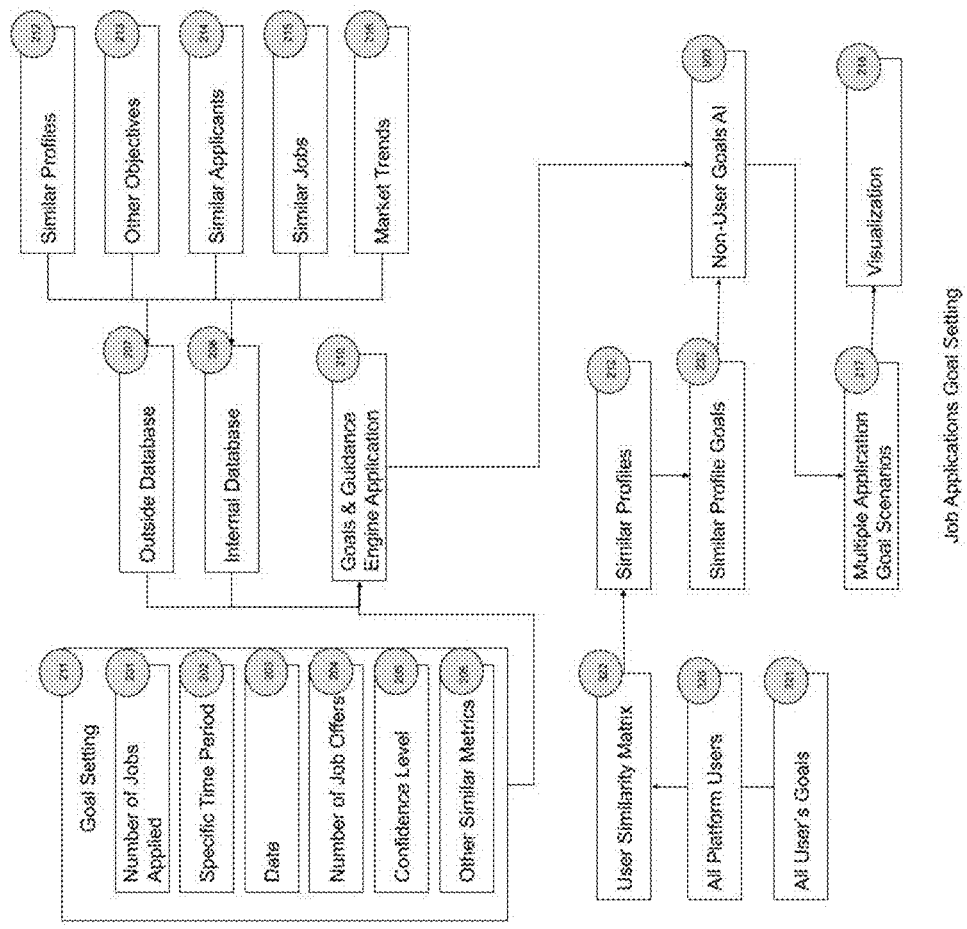
FIG. 18 is a flowchart showing goal setting in the illustrated embodiments.

As depicted in FIG. 17, in another implementation of the digital job application kanban board 200, the user 8 could set a specific goal of a number of jobs applied for 201 in a specific time period 202, such as each day or week, or the individual could input a target date 203, number of job offers 204, confidence level 205, or some similar metric or analytic, related to her job search. In this case, as depicted in FIG. 18, the system would use outside databases 207 and internal databases 208, algorithms (perhaps generated and/or implemented in a goals and guidance engine application 210), and additional information from user inputs 211, similar profiles 212, other objectives 213, and data about similar applicants 214, similar jobs 215, and market trends 216 to evaluate multiple and scenarios 217 and calculate how long it is likely to take the individual to receive an offer, given different numbers of job opportunities (applications) that they act upon. In a further implementation, goals may be set by a job coach, career coach, an artificial intelligence system or some other user 8, and the output of the goals and guidance engine 210 may be displayed in a different manner than those goals created by the user 8.

As depicted in FIG. 18, in one possible implementation of this using AI 903, the output of the goals and guidance engine application 210 may be ingested by the AI 903, which would access other users' profile data 320 (gathered through means like a resume 250, social or professional networking profile 251, or digital profile 252) and the other users' goals 321 to create a user similarity matrix 322 to identify other individuals with similar profiles 212. The AI 903 would then suggest goals 323 that were associated with successful candidates most like the jobseeker 8 or were created by other individuals whose goals were correlated with an offer of employment in the same or a similar position to that sought by jobseeker 8. As depicted in FIG. 17, further visualizations 218 of the implementation of these goals, guidance, and strategy could be included as well.

Networking Goals Setting

As depicted in FIG. 19, in another implementation of the digital networking kanban board 220, the user 8 could set a specific goal for the number of contacts reached out to 221 in a specific time period 222, such as each day or week, or the individual could input a target date 223, number of contacts 224, confidence level 225, or some similar desired metric or analytic leading up to a conversation with a particular individual or group of contacts. In this case, as depicted in FIG. 20, the system would use outside databases 207, internal databases 208, and algorithms (perhaps generated and/or implemented in a goals and guidance engine application 210), and additional information from user inputs 211, similar profiles 212, other objectives 213, and market trends 216 to evaluate multiple scenarios and estimate how long it would take the individual to connect with a contact 218 given different numbers of networking cards created and acted upon. In a further implementation, goals may be set by a job coach, career coach, an artificial intelligence/machine learning module, or some other user 8, and the output of the goals and guidance engine 210 may be displayed in a different manner than those goals created by the user.

As depicted in FIG. 20, in one possible implementation of this using AI 903, the output of the goals and guidance engine application 210 may be ingested by the AI 903 which would access other user's profile data 320 gathered through means like a resume 250, social or professional networking profile 251 or digital profile 252 and the other user's goals 321 to create a user similarity matrix 322 to identify other individuals with similar profiles 212. The AI 903 would then suggest goals 323 that were associated with successful candidates most like the jobseeker 8 or were created by other individuals whose goals were correlated with an offer of employment in the same or a similar position to that sought by jobseeker 8. As depicted in FIG. 19, further visualizations 218 of the implementation of these goals, guidance, and strategy could be included as well.

Job, Networking and Task List Continuous Improvement and Optimization

As depicted in FIGS. 6, 7, and 11, the system will use artificial intelligence components 64, including machine learning and various other applications, to continuously refine and increase the application's predictive accuracy and the user's job-hunting success. These refinements may include making adjustments that affect all users, some portion of the users, or individual users and may include making customized adjustments that to improve the application's efficiency and effectiveness. As depicted in FIGS. 6 and 11, the AI 64 would analyze all user actions on the application 190 and import other data 48, including but not limited to attempting to determine what was most likely to cause an observed result, reviewing the results, and making automatic adjustments to job cards 36 or other recommendations as appropriate.

As one of many various examples, the best practice recommendations included in job cards could be modified 49, 64 for all users, a group of users, or a specific user. This can be accomplished in a variety of ways. For example, the AI and machine learning built into this application could track job and networking card activity to determine job hunting success (which may be calculated in one embodiment of this invention by identifying the principal components of all networking cards 125 and job cards 36 to create similarity indices for each combination of the discrete components relative to each other.) Based upon the similarity index for each discrete unit of content in the board of a user 8 and other users' boards, the system could create a weighted vector as a function of a distance to the relevant goal (such as offer 34 or recurring connection 124), thereby providing more weight to tasks, types of jobs, etc. that (e.g., of the user's attributes such as a user's profile data and another's user's profile data) would lead to the smallest estimated distance to the goal. For job cards 36 or networking cards 125 that pass a threshold of similarity, for subcomponents that have the highest weight towards the goal (for example, closest towards an offer 34 or recurring connection 124), the system would insert a recommendation such as a suggested task 80 to do. Further, for job cards 36 or networking cards 125 that most closely resemble other respective cards that led to success by similar users via the similarity indices, the system would re-order those cards 125 in the respective kanban boards 126 of users 8.

Further, the AI may also analyze profiles, resumes, and/or other information of individuals 260 who were successful job candidates at a similar company and/or had similar work responsibilities either online or using the application. Applying supervised and unsupervised learning to data regarding the jobs an end user is applying for or individuals they try to network with, the AI 64, 149 may add, eliminate or modify tasks 49, job opportunities 36, networking opportunities, general feedback, and tactical suggestions 125, resources to read or view, jobs to apply for, individuals to network with, and/or job-hunting tools or services to use to optimize their job hunt.

Platform Reminders & Goal Notifications

Figure 21:
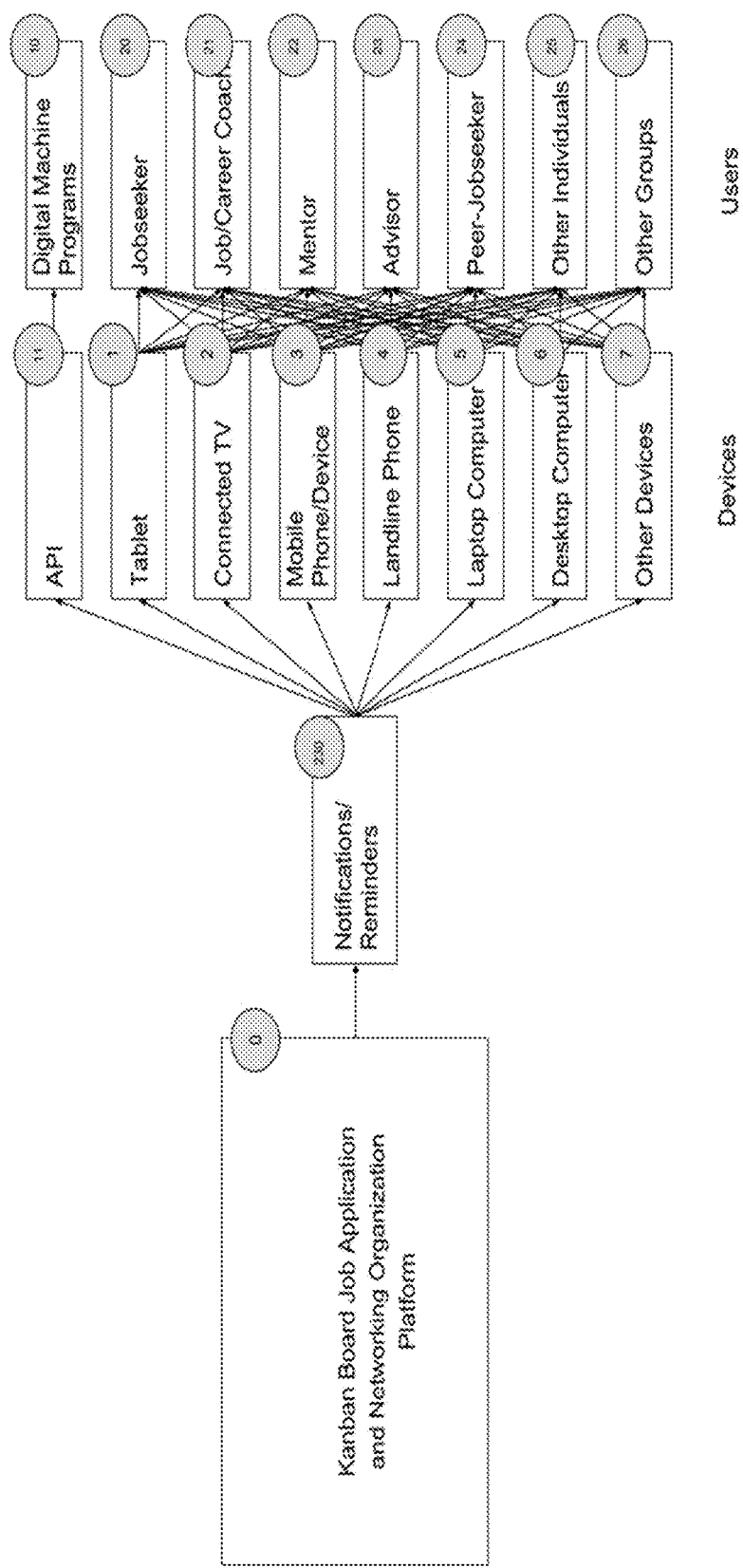
FIG. 21 is a flowchart illustrating notification paths in the illustrated embodiments.

Users 8 would be prompted with notifications for several purposes. As depicted in FIG. 21, to prevent overdue or missed tasks and events, the platform 0 may create reminders 230, which could be dispatched though via a variety of devices and platforms (such as tablet 1, connected TV 2, mobile phone device or device that is not mobile or mobile-optimized 3, landline phone 4, laptop computer 5, desktop computer 6, other devices 7, or through an API 11) to users 8, who as above may encompass digital machine programs 10 through the API 11 or individuals such as the jobseeker 20, job/career coach 21, mentor 22, advisor 23, peer-jobseeker 24, other individual entities 25, or a group thereof 26. Notifications could also be sent as reminders to keep creating cards to keep on target for (that is, to have a particular level of confidence that they will achieve) a specific goal 231, such as a specific confidence level that they will receive some number of interviews by a specific date, as depicted in FIGS. 17 and 19.

Figure 22:
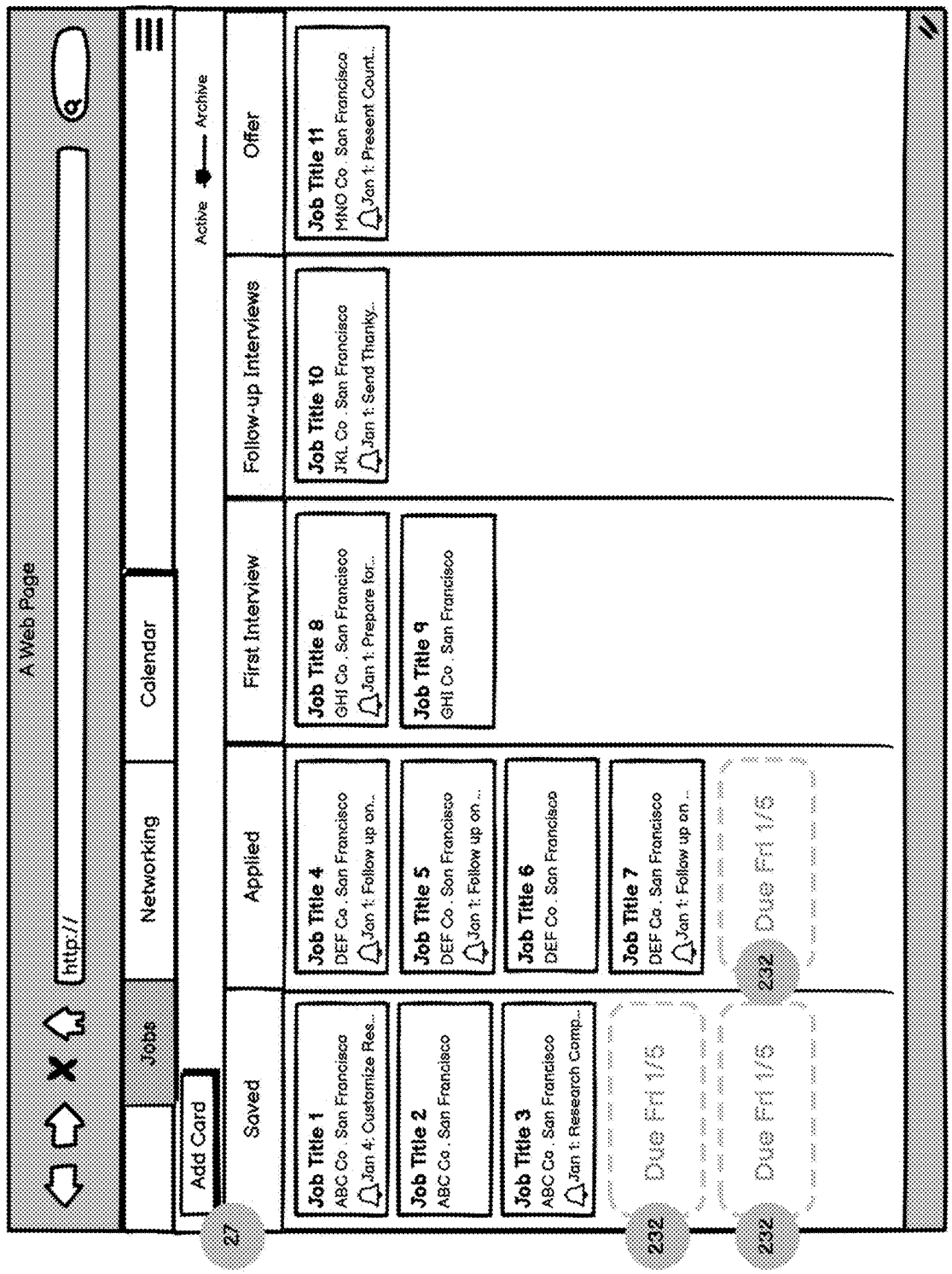
FIG. 22 is a simulated screenshot of job application cards in various states, integrated with goals and tasks in the illustrated embodiments.
Figure 23:
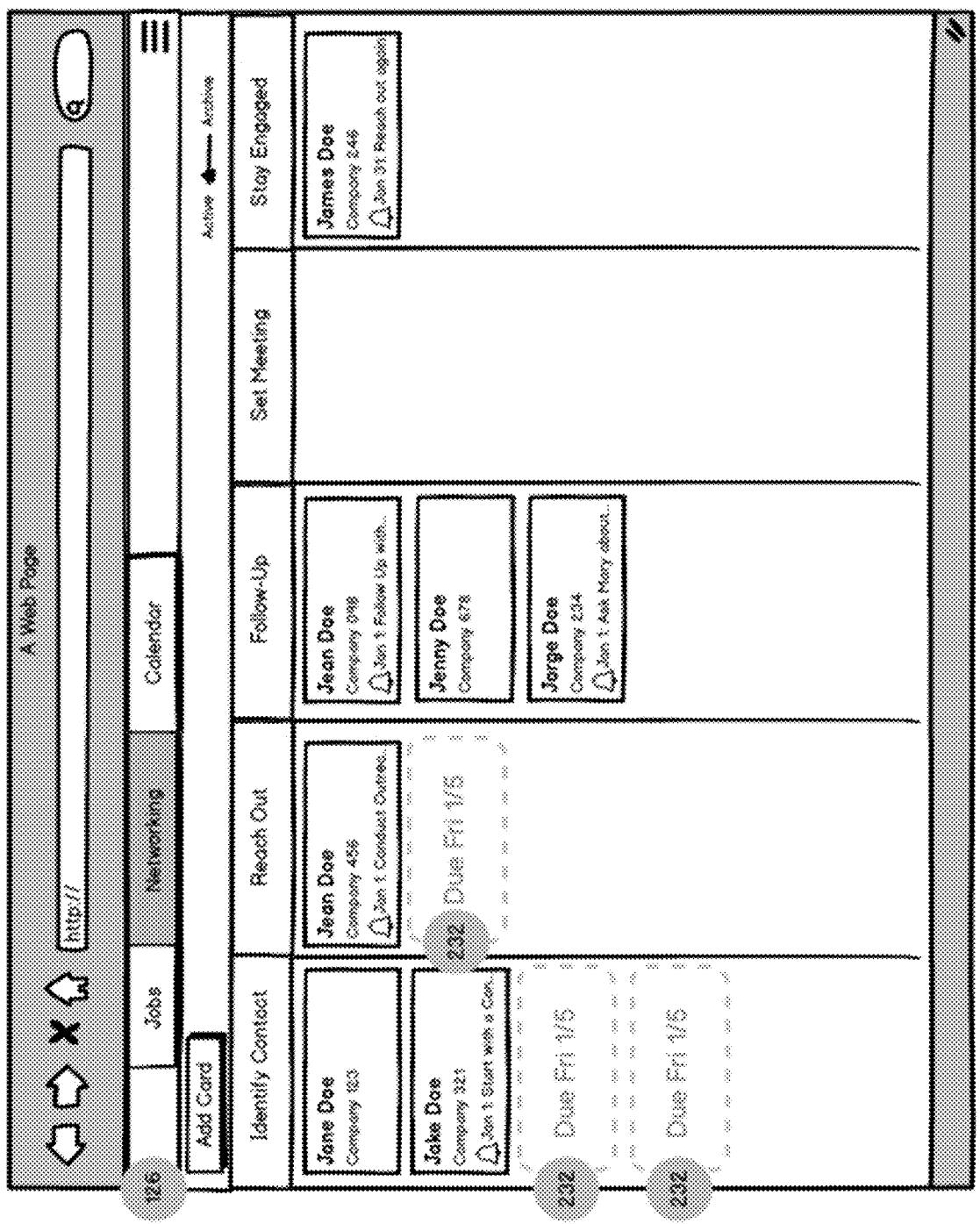
FIG. 23 is a simulated screenshot of networking opportunity cards in various states, integrated with goals and tasks in the illustrated embodiments.

Further, as depicted in FIGS. 22 and 23, there would be notifications 232, such as empty placeholders in the networking opportunities board 126 and job application board 27, to indicate how many new cards the user should create/advance by the date indicated in the notification. Additionally, as depicted in FIG. 7, tasks and events could be created and populated in one's calendar 233 based upon one's defined goals, such as to remind users to identify job applications to add to their "Saved" column or to look for networking opportunities to add to their "Identify Contact" column.

Task List

Figure 24:
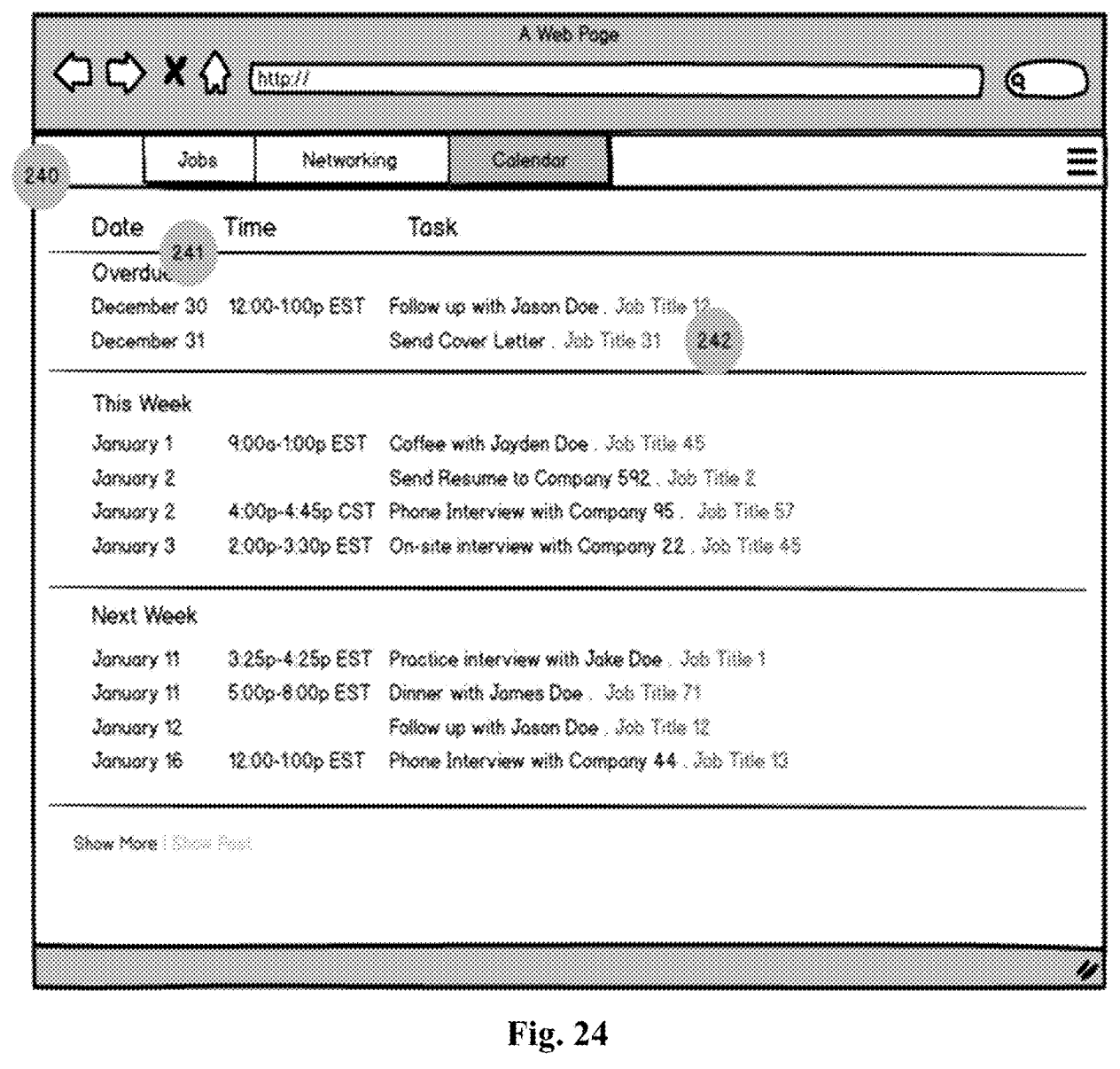

As depicted by FIGS. 7 and 24, in another potential implementation of this platform, there may be an additional "calendar" page that aggregates all the date-related elements across the platform, including tasks 240, deadlines, and reminders from all job and networking cards. This page would organize all those date-related elements in a user-defined or recommended order 241, such as by category, by card type, by priority, or in chronological ascending or descending order, grouped him in each case into active events, archived events, and overdue events. These groupings and listings could then link 242 back directly to the card that they are associated with.

When an act is described herein as occurring "as a function of" a particular thing, the system is configured so that the act is performed in different ways depending on one or more characteristics of the thing.

Any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be modified or combined will be readily apparent to those of ordinary skill in the art in view of the teachings herein. Such modifications, variations, and combinations are intended to be included within the scope of the claims.

All publications, prior applications, and other documents cited herein are hereby incorporated by reference in their entirety as if each had been individually incorporated by reference and fully set forth. Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is not to be limited to the details of structure and operation shown and described in the specification and drawings.

What is claimed is:

1. A system providing a practical and automatically supplemented implementation of kanban techniques to job search and applicant processes, comprising:
   a processor and
   a memory in communication with the processor, the memory storing programming instructions executable by the processor to:
      electronically store data regarding a set of job opportunities associated with an applicant, where each job opportunity is associated with a particular stage of development of the job opportunity, and wherein each job opportunity in the set of job opportunities is associated with one of a predetermined plurality of stages of development;
      programmatically retrieve additional information about at least two of the set of job opportunities from an outside electronic data source;
      determine that the additional information does not include an expected component
      estimate, using a confidence interval, the expected component, and update the additional information based on the estimate;
      apply a weighting factor, based on the additional information, to the at least two of the set of job opportunities; and
      produce a first display showing at least part of the data regarding the set of job opportunities, wherein the first display visually groups the at least part of the data by the stage of development associated with each job opportunity, and wherein the first display is automatically organized and updated as a function of the weighting factor.

2. The system of claim 1, wherein the programming instructions are further executable by the processor to:
   automatically create a list of actions to be taken by the applicant, the list of actions including a first action in furtherance of a first job opportunity and a second action in furtherance of a second job opportunity, the list of actions being sorted by an artificial intelligence component that operates as a function of the additional information from the outside electronic data source about jobs similar to the first job and the second job, respectively, and applicants similar to the applicant; and
   produce a display of the list of actions.

3. The system of claim 2, wherein the artificial intelligence component also performs the sorting as a function of:
   at least part of the data regarding the set of job opportunities associated with the applicant; and
   information that is not part of the data regarding the set of job opportunities associated with the applicant.

4. The system of claim 1, wherein the programming instructions are further executable by the processor to:
   responsively to input from a user, change the stage of development of a first job opportunity in the set of job opportunities; and
   responsively to the additional information programmatically received from the outside electronic data source, change the stage of development of a second job opportunity in the set of job opportunities; and
   update the first display based on at least one of: the changed stage of development of a first job opportunity or the change of the stage of development of a second job opportunity.

5. The system of claim 1, wherein the programming instructions are further executable by the processor to:
   electronically store data regarding a set of networking opportunities associated with the applicant, where each networking opportunity is associated with a particular stage of development of a networking relationship with a networking target, and wherein the set of networking opportunities comprises a first networking opportunity and a second networking opportunity; and
   produce a second display showing at least part of the data regarding each of the first networking opportunity and the second networking opportunity, wherein the second display visually groups the first and second networking opportunities by their associated stages of development.

6. The system of claim 5, wherein the programming instructions are further executable by the processor to:
   produce a prioritized list of actions associated with recommended networking contacts to be pursued by the applicant, the list of actions comprising a first networking contact in furtherance of the first networking opportunity and a networking action in furtherance of a networking job opportunity, the list being prioritized by an artificial intelligence component; and
   produce a third display comprising the list of actions.

7. The system of claim 6, wherein the artificial intelligence component performs the prioritizing as a function of:
   at least part of the data regarding the set of networking opportunities associated with the applicant; and
   a portion of the additional information from the outside electronic data source that is not part of the data regarding the set of networking opportunities associated with the applicant.

8. The system of claim 6, wherein the artificial intelligence component performs the prioritization as a function of at least part of the data regarding the set of job opportunities associated with the applicant.

9. A method of using a processor to provide a practical and automatically supplemented implementation of kanban techniques to job search and applicant processes, comprising:
   using the processor to electronically store data regarding a set of job opportunities associated with an applicant, where each job opportunity is associated with a particular stage of development of the job opportunity, and wherein the set of job opportunities comprises a first job opportunity and a second job opportunity;
   with the processor, automatically weighting the stored data regarding the set of job opportunities based on supplemental data from an outside electronic data source; and
   operate an artificial intelligence component to calculate at least one of:
      how long it is likely to take the applicant to receive a job offer; or
      how likely it is that the applicant will receive a job offer within a particular amount of time; and
   using the processor to automatically produce and automatically update a first-display of a result or the calculation.

10. The method of claim 9, further comprising:
using the processor to produce a list of actions to be taken by the applicant, the actions comprising a first action in furtherance of the first job opportunity and a second action in furtherance of the second job opportunity, the list being automatically sorted as a function of output of artificial intelligence programming executed by the processor, where the output is a function of a selected portion of the supplemental data; and
using the processor to produce a second display showing the list of actions.

11. The method of claim 10, wherein the output of the artificial intelligence programming is a function of:
at least part of the data regarding the set of job opportunities associated with the applicant; and
information that is not part of the data regarding the set of job opportunities associated with the applicant.

12. The method of claim 9, further comprising:
responsively to input from a user, automatically changing the stage of development of a first job opportunity in the set of job opportunities;
responsively to data programmatically received from another system, automatically changing the stage of development of a second job opportunity in the set of job opportunities; and
update the first display based on at least one of: the changed stage of development of the first job opportunity or the changed stage of development of the second job opportunity.

13. The method of claim 9, further comprising:
electronically storing data regarding a set of networking opportunities associated with the applicant, where each networking opportunity is associated with a particular stage of development of a networking relationship with a networking target, and wherein the set of networking opportunities comprises a first networking opportunity and a second networking opportunity; and
using the processor to automatically produce a second display of at least part of the data regarding each of the first networking opportunity and the second networking opportunity, wherein the second display visually groups the first and second networking opportunities by their associated stages of development.

14. The method of claim 13, further comprising:
using the processor to automatically supplement the stored data regarding the set of networking opportunities with further supplemental data from the outside electronic data source;
using the processor to automatically produce a prioritized list of actions associated with recommended networking contacts to be pursued by the applicant, the list of actions comprising a first networking contact in furtherance of the first networking opportunity and a networking action in furtherance of a networking job opportunity, the list of actions being automatically sorted-by artificial intelligence programming as a function of the further supplemental data; and
using the processor to automatically produce a display of the list of actions after the list of actions is sorted.

15. The method of claim 14, wherein the further supplemental data that the artificial intelligence programming performs the sorting as a function of comprises information that is not part of the data regarding the set of networking opportunities associated with the applicant.

16. A system providing a practical and automatically supplemented implementation of kanban techniques to job search and applicant processes, comprising:
a processor and
a memory in communication with the processor, the memory storing programming instructions executable by the processor to:
electronically store data regarding a set of job opportunities associated with an applicant, where each job opportunity is associated with a particular stage of development of the job opportunity, and wherein each job opportunity in the set of job opportunities is associated with one of a predetermined plurality of stages of development;
programmatically retrieve additional information about a first one and a second one of the set of job opportunities from an outside electronic data source;
produce a first display showing at least part of the data regarding the set of job opportunities, wherein the first display visually groups the at least part of the data by the stage of development associated with each job opportunity, and wherein the first display is automatically organized and updated as a function of the additional information from the outside electronic data source;
operate an artificial intelligence component to calculate at least one of:
how long it is likely to take the applicant to receive a job offer; or
how likely it is that the applicant will receive a job offer within a particular amount of time; and
display a result of the calculation.

17. The method of claim 10, wherein the output of the artificial intelligence programming weights the first job opportunity relative to the second job opportunity as a function of at least one weighting parameter selected from the weighting parameter group consisting of:
where the data regarding the first job opportunity identifies a first employer and the data regarding the second job opportunity identifies a second employer, data regarding addition and separation of employees from the first employer and the second employer;
where the data regarding the first job opportunity characterizes a first role and the data regarding the second job opportunity characterizes a second role, data regarding a competitiveness of the applicant relative to other candidates who have applied for jobs associated with the first role, the second role, or roles determined by the artificial intelligence programming to be similar; and
where the data regarding the first job opportunity does not include a particular salary, supplemental data estimating a compensation for the first job and a confidence interval.

18. The system of claim 16, wherein the programming instructions are further executable by the processor to:
electronically store data regarding each one of a set of networking opportunities associated with the applicant, where each networking opportunity is associated with a particular stage of development of a networking relationship with a networking target, and wherein the set of networking opportunities comprises a first networking opportunity and a second networking opportunity; and
produce a second display showing at least part of the data regarding each of the first networking opportunity and the second networking opportunity, wherein the second display visually groups the first and second networking opportunities by their associated stages of development.

19. The system of claim 16, wherein the programming instructions are further executable by the processor to:
produce a list of actions to be taken by the applicant, the actions comprising a first action in furtherance of the first job opportunity and a second action in furtherance of the second job opportunity, the list of actions being automatically sorted as a function of output of artificial intelligence programming executed by the processor, where the output is a function of a selected portion of the additional information; and
using the processor to produce a second display showing the list of actions.

* * * * *